United States Patent [19]

Tajima et al.

[11] Patent Number: 4,860,042
[45] Date of Patent: Aug. 22, 1989

[54] FILM PACKAGE AND DEVICE FOR LOADING FILMS

[75] Inventors: Kenji Tajima; Hiroshi Kushima; Sadami Yamada, all of Kanagawa, Japan

[73] Assignee: Fuji Photo Film Co., Ltd., Kanagawa, Japan

[21] Appl. No.: 54,175

[22] Filed: May 26, 1987

[30] Foreign Application Priority Data

May 23, 1986 [JP] Japan .................. 61-119975
Jul. 15, 1986 [JP] Japan .................. 61-167364
Nov. 29, 1986 [JP] Japan .................. 61-284479

[51] Int. Cl.⁴ .............................. G03B 17/26
[52] U.S. Cl. .................... 354/277; 378/174; 378/182
[58] Field of Search ............ 354/174, 276, 277, 283; 378/169, 172, 173, 174, 182; 250/475.2

[56] References Cited

U.S. PATENT DOCUMENTS 4,663,528 5/1987 Fujiwara et al. ............ 378/172 X

FOREIGN PATENT DOCUMENTS 56-5141 5/1981 Japan .
56-7931 6/1981 Japan .

Primary Examiner—L. T. Hix
Assistant Examiner—Brian W. Brown
Attorney, Agent, or Firm—Sughrue, Mion, Zinn, Macpeak & Seas

[57] ABSTRACT

A film package has a flexible light-shielding bag with a stack of sheet films stored therein, the flexible light-shielding bag having at least opposite ends sealed in a direction in which the flexible light-shielding bag can be pulled out, said opposite ends being folded back on one surface and joined together by a seal. The film package is placed in a holder which can be inserted into and removed from a main body of a film loading device.

35 Claims, 18 Drawing Sheets (PRIOR ART) FIG.1a
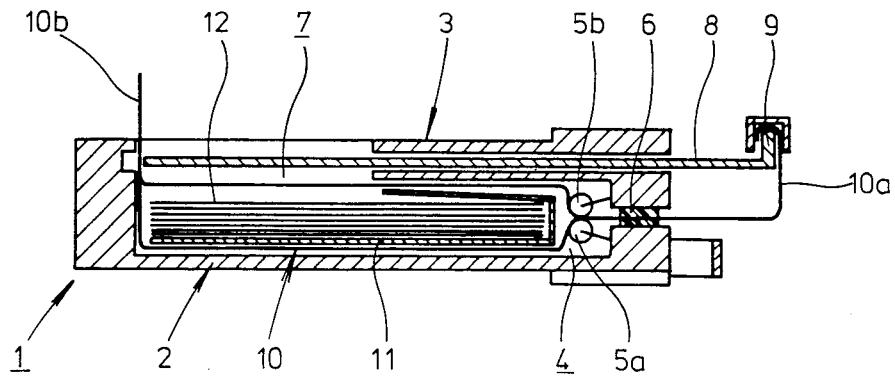
(PRIOR ART) FIG.1b
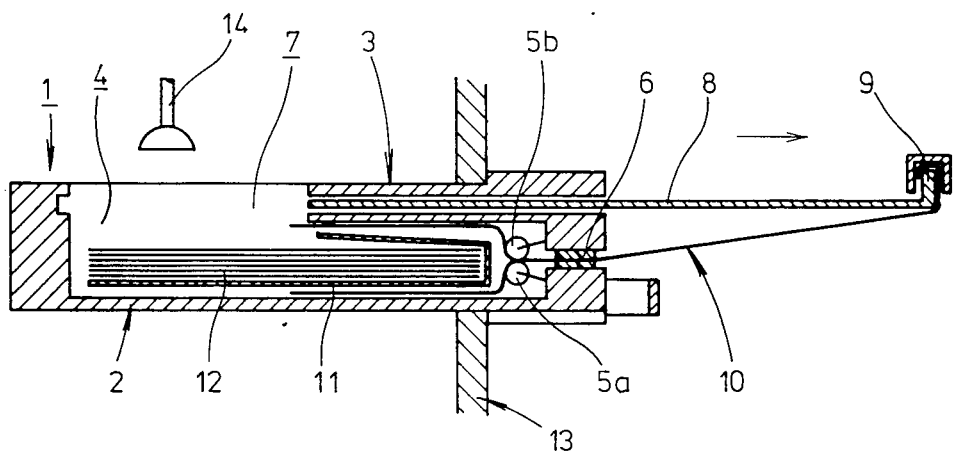

(PRIOR ART) FIG. 2a
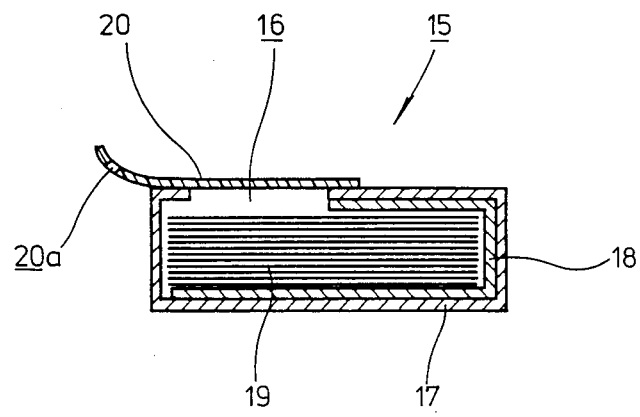
(PRIOR ART) FIG. 2b
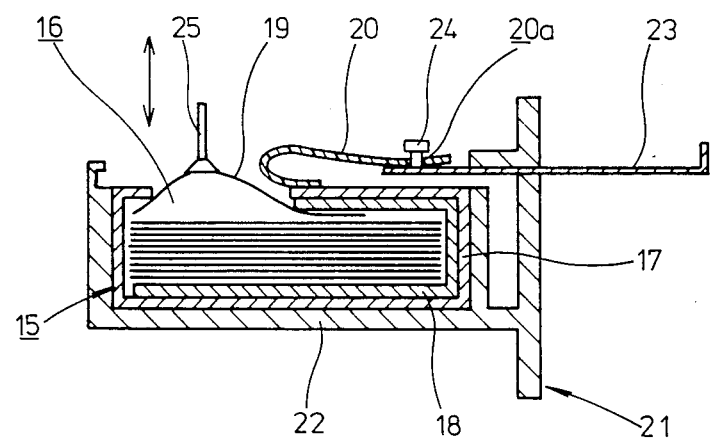

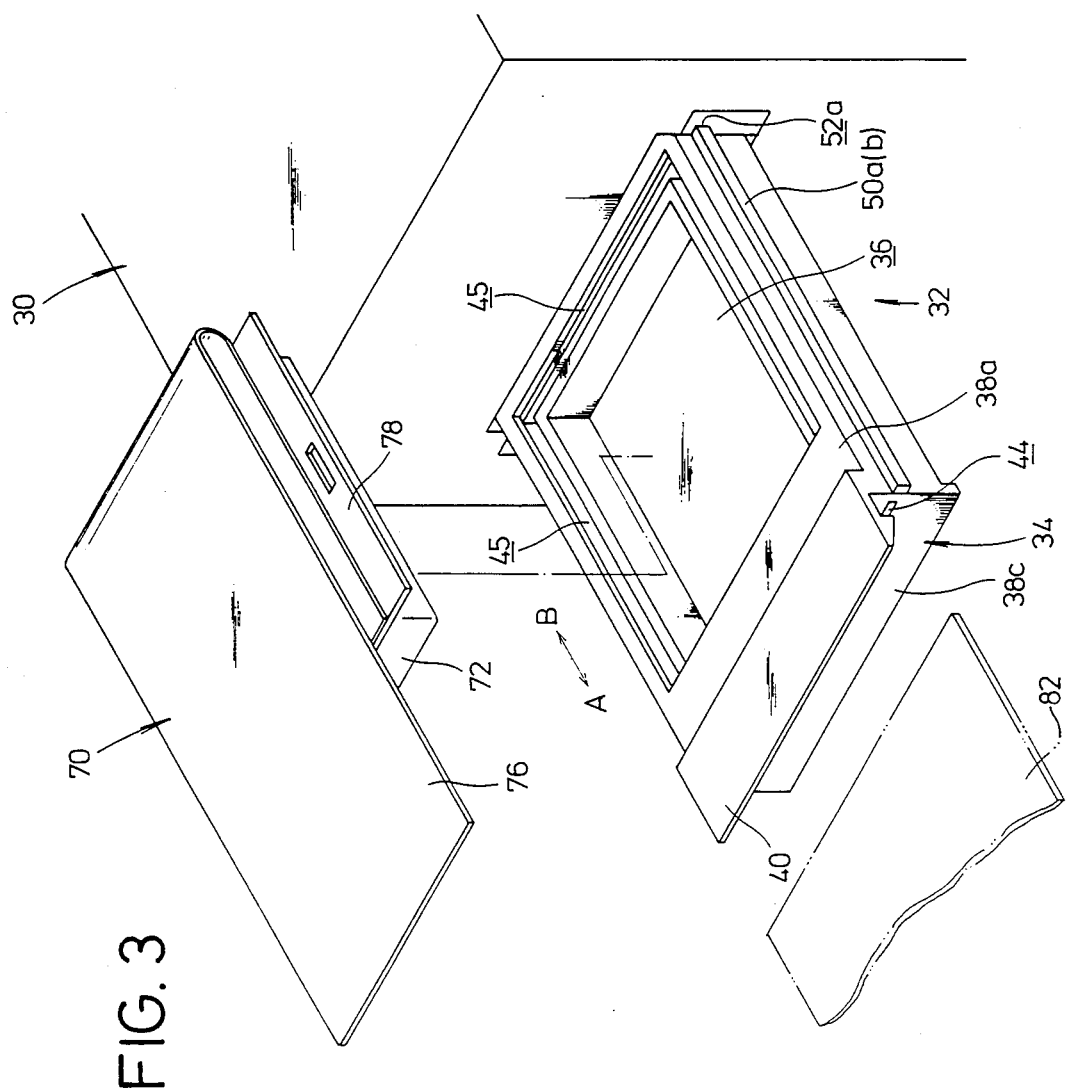

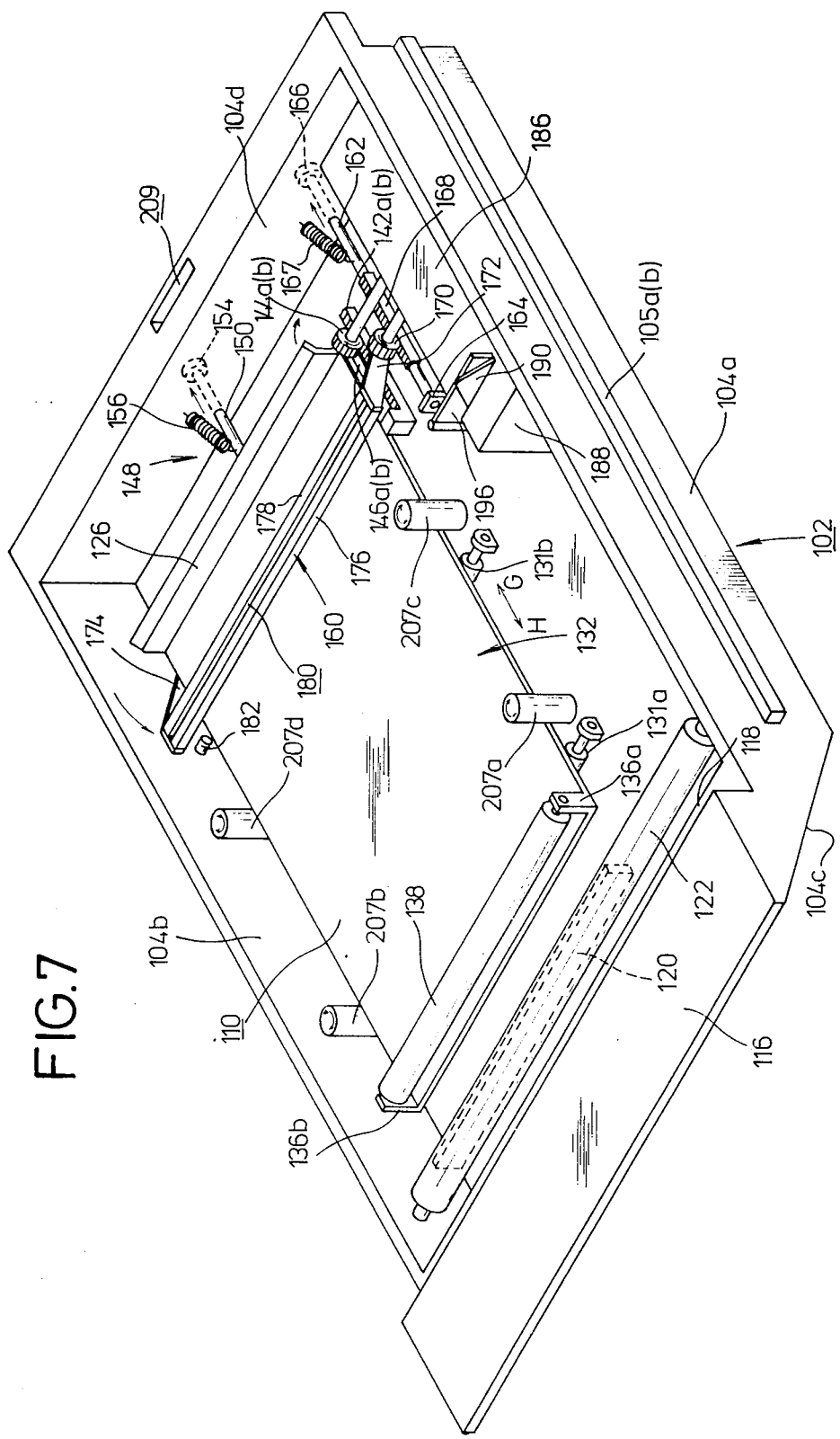

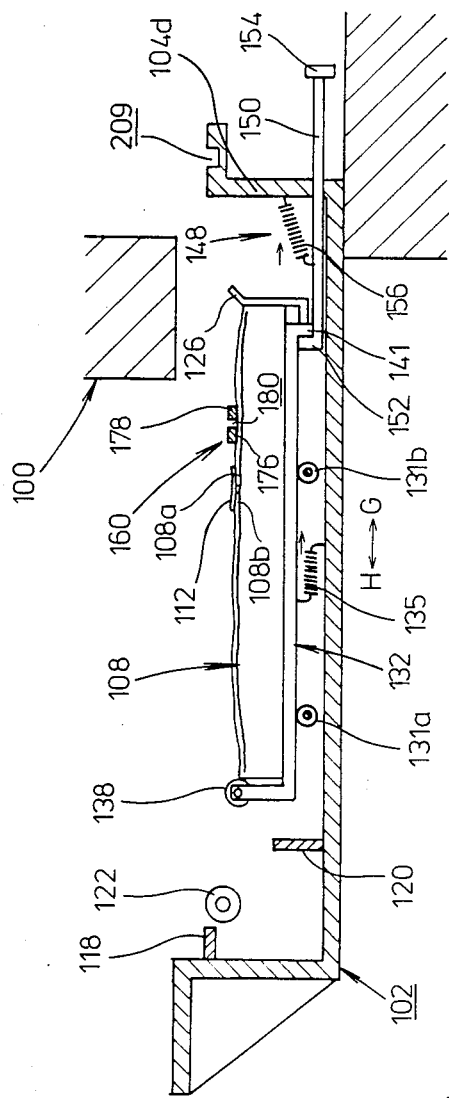
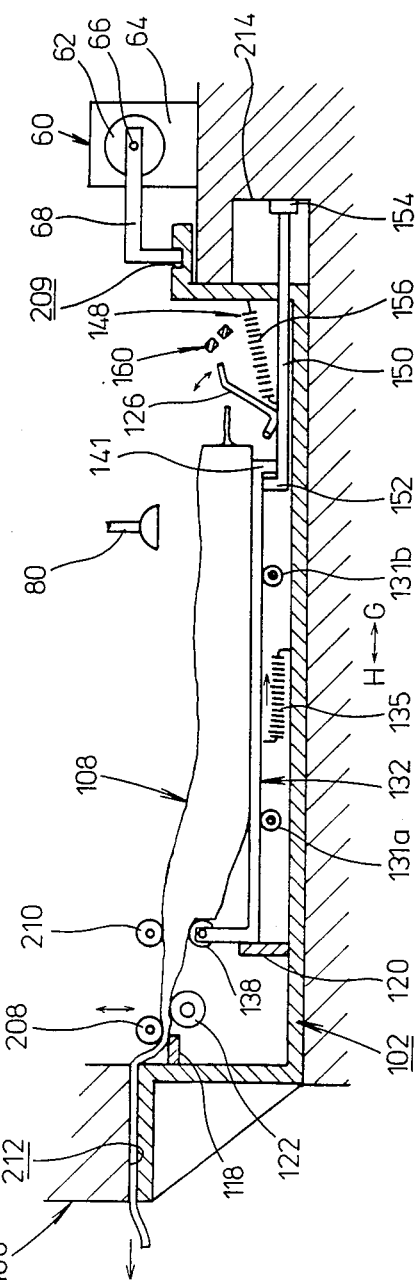
FIG.8(a)
FIG.8(b)

FILM PACKAGE AND DEVICE FOR LOADING FILMS

BACKGROUND OF THE INVENTION

The present invention relates generally to a film package and a device for loading films, and more particularly to a film package for storing a plurality of sheet films therein and a device for loading such a film package into an image recording apparatus or the like in a bright environment.

Radiation image films are widely used in the medical field for photographing objects such as human bodies with X rays for medical diagnosis. For photographing an object on such an X-ray film, it has been customary to load the X-ray film into a radiation image photographing device under a light-shielded environment and expose the emulsion layer of the film directly to an X ray having passed through the object for recording the image of the object thereon.

There has recently been developed and widely used a radiation image recording and reproducing system for producing the radiation-transmitted image of an object using a stimulable phosphor material capable of emitting light upon exposure to stimulating rays. When a certain phosphor is exposed to a radiation such as X-rays, α-rays, β-rays, γ-rays, cathode rays, or ultraviolet rays, the phosphor stores a part of the energy of the radiation. When the phosphor exposed to the radiation is subsequently exposed to stimulating rays such as visible light, the phosphor emits light in proportion to the stored energy of the radiation. The phosphor exhibiting such a property is referred to as a "stimulable phosphor".

In the radiation image recording and reproducing system employing such a stimulable phosphor, the radiation image information of an object such as a human body is stored in a sheet having a layer of stimulable phosphor, and then the stimulable phosphor sheet is scanned with stimulating rays such as a laser beam to cause the stimulable phosphor sheet to emit light representative of the radiation image. The emitted light is then photoelectrically detected to produce an image information signal that is electrically processed for generating image information which is recorded on a recording medium such as a photographic photosensitive material or displayed as a visible image on a CRT or the like.

The visible image thus produced may be recorded on a recording medium by an image recorder such as an image output laser printer, for example. In the image output laser printer, photographic films stored as a recording material in a magazine are loaded, and taken out one by one by a sheet delivery or feeding mechanism such as a suction cup. Thereafter, the film is exposed to a laser beam modulated by an electrical signal produced from the stimulable phosphor sheet for recording an image on the film. The exposed film is then transferred into an automatic developing device and processed thereby to develop the image. The film is thereafter stored in a prescribed place for use in medical diagnosis when required.

When loading the films into the image output laser printer, they must not be exposed to extraneous light. Therefore, it is general practice to load the films into the image output laser printer in a dark room, but the efficiency of such a loading process is low.

There is a strong demand for the loading of films under bright conditions such as in an ordinary bright room, and various methods have been proposed for loading films in bright environments. One such method is disclosed in Japanese Laid-Open Utility Model Publication No. 56(1981)-07931.

FIG. 1a of the accompanying drawings illustrates in cross section a conventional sheet film magazine 1 to be loaded into a radiation image photographing device. The film magazine 1 includes a casing 2 and a cover 3 openably hinged to the casing 2, the casing 2 and the cover 3 jointly defining a chamber 4. Gripper rollers 5a, 5b are rotatably supported respectively on the casing 2 and the cover 3. A light-sensitive member 6 is disposed between the casing 2 and the cover 3 for preventing extraneous light from entering the chamber 4 through the gripper rollers 5a, 5b. The cover 3 has a film access opening 7 that can be opened and closed by a shutter 8 mounted in the cover 3, the shutter 8 having a bent grip 9 on one end thereof.

A sheet film package 10 is housed in the magazine 1. The sheet film package 10 accommodates a plurality of unexposed sheet films 12 protected by cardboard 11. The sheet film package 10 has opposite ends 10a, 10b extending out of the magazine 1.

For loading the sheet film package 10 under a bright condition, the end 10a of the package 10 is engaged by the grip 9 of the shutter 8, and the other end 10b is cut off by scissors or the like. Then, the magazine 1 is loaded into an X-ray photographing device 13 (FIG. 1b), and the shutter 8 is manually pulled from the magazine 1. As a result, the package 10 is engaged by the grip 9 and drawn out of the magazine 1. Since the package 10 is gripped by the gripper rollers 5a, 5b, the unexposed films 12 are left in the chamber 4. As the shutter 8 is pulled out, the film access opening 7 is opened to expose the chamber 4 of the magazine 1 into the X-ray photographing device 13. The unexposed films 12 are then successively attracted by a suction device or suction cup 14 and delivered to a prescribed photographing position.

Another known device is disclosed in Japanese Laid-Open Utility Model Publication No. 56(1981)-05141. FIG. 2a shows in cross section a disclosed sheet film package 15 to be supplied to an X-ray photographing device. The film package 15 includes a light-shielded or sunproof container 17 in the form of a box having an opening 16. The light-shielded container 17 contains a plurality of unexposed films 19 protected by cardboard 18. A flexible light-shielding member 20 is applied over the opening 16 in light-shielding relation to protect the unexposed films 19 from exposure to extraneous light. One end of the flexible light-shielding member 20 is curved upwardly and has an engagement hole 20a defined near its edge.

The film package 15 of the above construction is positioned by a storage unit 22 housed in a magazine 21 as shown in FIG. 2b. The magazine 21 has a shutter 23 having an engagement pin 24 mounted on one end thereof. After the engagement pin 24 has engaged in the hole 20a of the flexible light-shielding member 20, the magazine 21 is loaded into an X-ray photographing device (not shown), and the other end of the shutter 23 is pulled out of the magazine 21 by fingers. As a result, the flexible light-shielding member 20 is peeled off the container 17 by the pin 24 engaging the hole 20a, and the opening 16 is opened in the X-ray photographing device. The uppermost unexposed film 19 is then attracted by a suction device 25 and delivered through the opening 16 into a given photographing position.

With the illustrated conventional device, however, the dedicated magazine 21 must be used to store the film package 15. This magazine must be of a rugged construction capable of withstanding stresses due to repeated attachment and removal thereof, and hence is considerably heavy. Therefore, it is laborsome for the operator to load and unload the magazine.

In order to load the films into the X-ray photographing device, it is necessary to attach the shutter to the end of the film package or the light-shielding member, and pull out the shutter after the magazine has been placed into the device. As a consequence, the film loading process of the above nature is tedious and considerably time-consuming.

SUMMARY OF THE INVENTION

Therefore, it is a primary object of the present invention to provide a film package for accommodating a stack of sheet films, and also a device for loading such a film package, the device having a removable holder for mounting the film package thereon, the arrangement being such that the film package is set on the holder which is then placed into the device, and the film package is opened while the film is being held in a light-shielded condition, so that no dedicated magazine is necessary and the films can be loaded easily under a light-shielded condition in a bright environment through a simple structure.

An object of the present invention is to provide a film package comprising a bag-like flexible light-shielding member with a stack of sheet films stored therein, the flexible light-shielding member having at least opposite ends sealed in a direction in which the flexible light-shielding member can be pulled out, the opposite ends being folded back on one surface and joined together by a fixing means.

Another object of the present invention is to provide a device for loading a film package storing a stack of sheet films, comprising a main body and a holder for placing said film package therein, said holder being removable from said main body.

Still another object of the present invention is to provide a device for loading a film package storing a stack of sheet films, comprising a holder or magazine for placing the film package therein, the holder or magazine having a receiver for storing the film package, the receiver being movable back and forth in a direction in which the film package can be pulled out, a light-shielding member pressable against the film package, the arrangement being such that when cutting off an end of the film package, the light-shielding member is pressed against the end of the film package to prevent extraneous light from entering the film package through the cut-off portion, the receiver and the light-shielding member being relatively movable away from each other to prevent the light-shielding member from interfering with the film package as it is pulled out.

Yet still another object of the present invention is to provide a device for loading a film package storing a stack of sheet films, comprising a holder or magazine for placing the film package therein, cutter means for cutting off the film package at a prescribed portion thereof in order to allow the sheet films to be loaded from the film package in a bright environment, and a storage portion disposed in the holder or magazine for accommodating the cutter means therein.

A further object of the present invention is to provide a device for loading a film package storing a stack of sheet films, comprising a holder or magazine for placing the film package therein, cutter means for cutting off the film package at a prescribed portion thereof in a bright environment, and guide means disposed in the holder or magazine for guiding the cutter means and preventing extraneous light from entering the film package through a cut-off end at the prescribed portion.

A still further object of the present invention is to provide a device for loading a film package storing a stack of sheet films, comprising a holder or magazine for placing the film package therein, folding means mounted in the holder or magazine for engaging a cut end of the film package, the arrangement being such that after the film package has been cut off at a prescribed portion thereof, a cut end is folded by the folding means in a direction opposite to the direction in which the film package is pulled out.

A yet further object of the present invention is to provide a device for loading a film package storing a stack of sheet films, comprising a holder or magazine for placing the film package therein, and engaging means disposed in said holder or magazine and including a stopper pressable against the film package, the arrangement being such that when cutting off an end of the film package, said stopper is pressed against the end of the film package to prevent extraneous light from entering the film package through the cut-off end, and said stopper is displaced away from the film package to pull the film package to expose the sheet films in a main body of the device.

A yet still further object of the present invention is to provide a device for loading a film package storing a stack of sheet films and having a film access opening closed by a cover, said device comprising a main body, an outer casing removably mounted in said main body and having an opening for feeding the sheet films therethrough, an inner casing for storing said film package therein and removable from said outer casing, and a shutter disposed in said outer casing for closing said opening and keeping the film package in a light-shielded condition for allowing said inner and outer casings from being taken together out of said main body.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 1a and 1b are cross-sectional views of a conventional film package;

FIGS. 2a and 2b are cross-sectional views of another conventional film package;

FIG. 3 is an exploded perspective view, partly omitted from illustration, of a film loading device and a film package to be mounted therein, according to the present invention;

FIG. 7 is an enlarged perspective view of a holder of the film loading device shown in FIG. 6;

FIGS. 8(a) and 8(b) are vertical cross-sectional views showing the manner in which the film package is placed into the film loading device illustrated in FIG. 6;

DETAILED DESCRIPTION OF THE PREFERRED EMBODIMENTS

FIG. 3 shows a film loading device according to the present invention, the film loading device having a main body or housing 30 with a film loader 32 disposed therein. The film loader 32 includes a holder 34 movable into and out of the main body 30.

Figure 4:
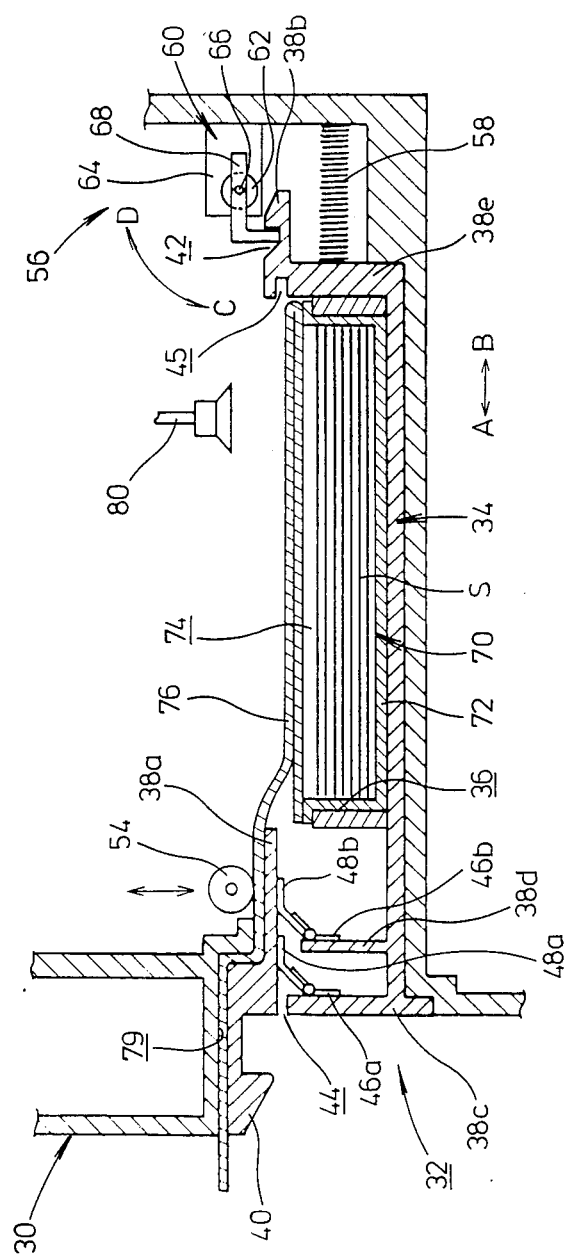
FIG. 4 is a vertical cross-sectional view of the film loading device with films loaded.

The holder 34 is in the form of a rectangular casing having an opening 36 for storing a film package (described later) therein. The holder 34 has an upper wall 38a disposed on an upper end thereof and extending into the opening 36, the upper wall 38a including a grip 40 projecting outwardly. As shown in FIG. 4, the holder 34 also includes another upper wall 38b disposed on the opposite upper end and projecting away from the opening 36, the upper wall 38b having a recess 42 defined in an upper surface thereof. The holder 34 has a front side wall 38c. A shutter insertion slot 44 of a prescribed with is defined between the upper wall 38a and the front side wall 38c. The holder 34 has a groove 45 defined in an upper portion thereof. A shutter member (described later) which is inserted through the shutter insertion slot 44 into the holder 34 can be fitted in the groove 45 to close the interior of the holder 34.

The holder 34 includes an inner side wall 38d disposed therein and extending upwardly in spaced relation to the front side wall 38c. Light-shielding members 48a, 48b are disposed between the inner side wall 38d and the front side wall 38c through spring-biased hinges 46a, 46b. The light-shielding members 48a, 48b are of a bent cross section, and extend in a direction perpendicular to the direction in which the holder 34 is pulled out of the main body 30. The light-shielding members 48a, 48b have upper surfaces held against the inner surface of the upper wall 38a to prevent extraneous light from entering the holder 34 through the slot 44.

Guide ridges 50a, 50b are fixed respectively to the opposite sides of the holder 34 and slidably inserted through respective guide grooves 52a, 52b defined in the main body 30 for allowing the holder 34 to move out of the main body 30 (see FIG. 3). The holder 34 has a stopper (not shown) for permitting the holder 34 to be pulled out of the main body 30 over a prescribed interval and also for allowing the holder 34 to be removed from the main body 30 when desired.

Figure 5:
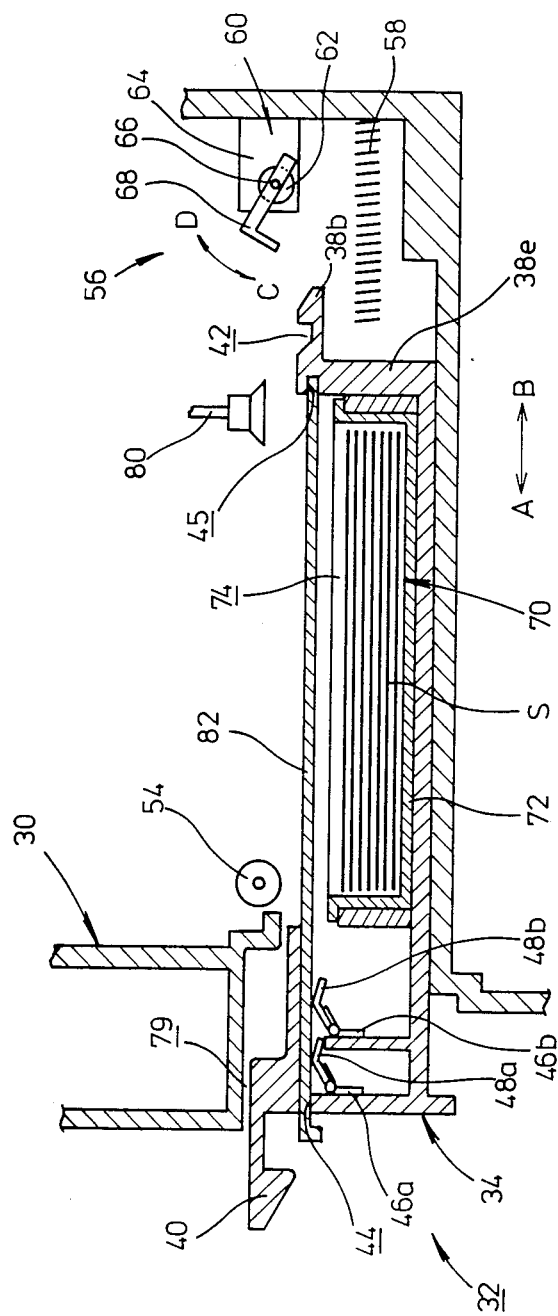
FIG. 5 is a vertical cross-sectional view showing the manner in which a holder is removed from the film loading device.

As illustrated in FIGS. 4 and 5, a roller 54 is rotatably supported in the main body 30 and normally urged by a spring (not shown) for pressed rolling engagement with the upper wall 38a of the holder 34. The main body 30 has an ejector mechanism 56 for securing the holder 34 to the main body 30 and for automatically ejecting the holder 34 out of the main body 30.

The ejector mechanism 56 includes a spring 58 for biasing a rear wide wall 38e of the holder 34 in the direction of the arrow A when the holder 34 is to be stored in the main body 30, and a stopper means 60 engageable in the recess 42 of the upper wall 38b for securing the holder 34 in the main body 30. The stopper means 60 has a rotary solenoid 62 fixed to an attachment 64 coupled to the main body 30 and having a drive shaft 66 to which an L-shaped hook 68 is attached. The hook 68 is angularly movable in response to energization of the rotary solenoid 62 for bringing a distal end thereof into the recess 42.

A film package to be placed in the film loading device thus constructed will be described below.

The film package is indicated by the reference numeral 30 in FIGS. 3 and 4. The film package 70 is essentially composed of a tray 72 for storing therein a stack of sheet films S, and a peelable light-shielding cover 76 covering a film access opening 74 of the tray 72 to keep the films S in a light-shielded condition.

The tray 72 with the opening 74 is in the form of a rectangular casing and has a grip 78 on its upper portion. The light-shielding cover 76 peelably attached to the tray 72 is made of a flexible material. The cover 76 is attached to the upper surface of the tray 72 parallel to the grip 78 and is folded back at an end of the tray 72, the cover 76 having an end extending outwardly from the opposite end of the tray 72.

The film package 70 is put into the film loading device as follows:

As shown in FIG. 3, after the holder 34 has been pulled out of the main body 30, the film package 70 is placed into the opening 36 of the holder 34. The film package 70 contains a stack of sheet films S with the film access opening 74 closed off by the cover 76 which has its end held against the upper wall 38a and the grip 40 and extending outwardly.

Then, the holder 34 is displaced in the direction of the arrow B while the guide ridges 50a, 50b are sliding in and along the guide grooves 52a, 52b, respectively, and the stopper means 60 of the ejector mechanism 56 is actuated. More specifically, as shown in FIG. 4, the rotary solenoid 62 is energized to rotate the drive shaft 66 to turn the hook 68 in the direction of the arrow C. The distal end of the hook 68 is then brought into the recess 42 of the upper wall 38b of the holder 34, which is now securely anchored in the main body 30 with its rear side wall 38e resiliently biased by the spring 58 in the direction of the arrow A. The end portion of the cover 76 placed on the upper wall 38a of the holder 38 is gripped between the roller 54 and the upper wall 38a under the resiliency of the spring (not shown). The end of the cover 76 is exposed out of the main body 30 through a gap 79 defined between the main body 30 and the grip 40.

The exposed end of the cover 76 is then gripped and pulled by the operator in the direction of the arrow A. The cover 76 is peeled off the upper surface of the tray 72 and finally taken out of the main body 30, thus opening the film access opening 74 in the main body 30. Since the upper wall 38b of the holder 34 is engaged by the hook 68, the upper wall 38b is held down against upward movement. Inasmuch as the roller 53 is pressed against the upper wall 38a of the holder 34 under the spring bias, extraneous light is prevented from entering the main body 30 through the gap 79 thereby to shield the film loader 32 against light.

Thereafter, a film feeding mechanism 30 such as a suction cup is actuated to pick up the sheet films S one by one from the film package 70 and deliver them to an image recorder, not shown.

After all of the sheet films S have been fed out of the film package 70 by the sheet feeding mechanism 80, the sheet feeding mechanism 80 is inactivated, and the ejector mechanism 56 is operated to pop the holder 34 out of the main body 30.

More specifically, the rotary solenoid 62 is energized to rotate the drive shaft 66 for thereby turning hook 68 in the direction of the arrow D out of the recess 42, whereupon the holder 34 is disengaged from the hook 68 and displaced in the direction of the arrow A under the resilient forces of the spring 58 until the holder 34 projects out of the main body 30 for a prescribed length or interval. The operator then pulls the grip 40 to take the holder 34 out to a prescribed position, after which the empty film package 70 is removed, and a new film package 70 with a given number of sheet films S stored is placed into the holder 34, which is then inserted into the main body 30 in the same process as described above.

The holder 34 can be removed from the main body 30 for maintenance or servicing of the main body 30 even if a film S or films S remain in the film package 70.

For such removal of the holder 34, as shown in FIG. 5, a shutter 82 is inserted through the slot 44 into the holder 34 after the main body 30 has been inactivated. As the shutter 82 is inserted, its distal end angularly moves the light-shielding members 48a, 48b against the resiliency of the spring-biased hinges 46a, 46b. Continued insertion of the shutter 82 in the direction of the arrow B causes the edges of the shutter 82 to fit into the groove 45 of the holder 34 while the shutter 82 covers the film package 70 mounted in the opening 36. Therefore, the film access opening 74 of the film package 70 is closed by the shutter 82 to shield a remaining film or films S from the exterior of the film package 70.

The ejector mechanism 56 is now driven to push the holder 34 in the direction of the arrow A, after which the non-illustrated stopper is released to allow the holder 34 to be dislodged from the main body 30. Because the film package 70 in the holder 34 is completely shielded from light, any film or films S in the film package 70 are not exposed to extraneous light. The main body 30 can then be maintained or serviced.

The main body 30 can also be maintained or serviced without removing the holder 34 from the main body 30 while the shutter 82 is being installed in the holder 34.

Film loading devices according to other embodiments of the present invention will be described hereinbelow.

Figure 6:
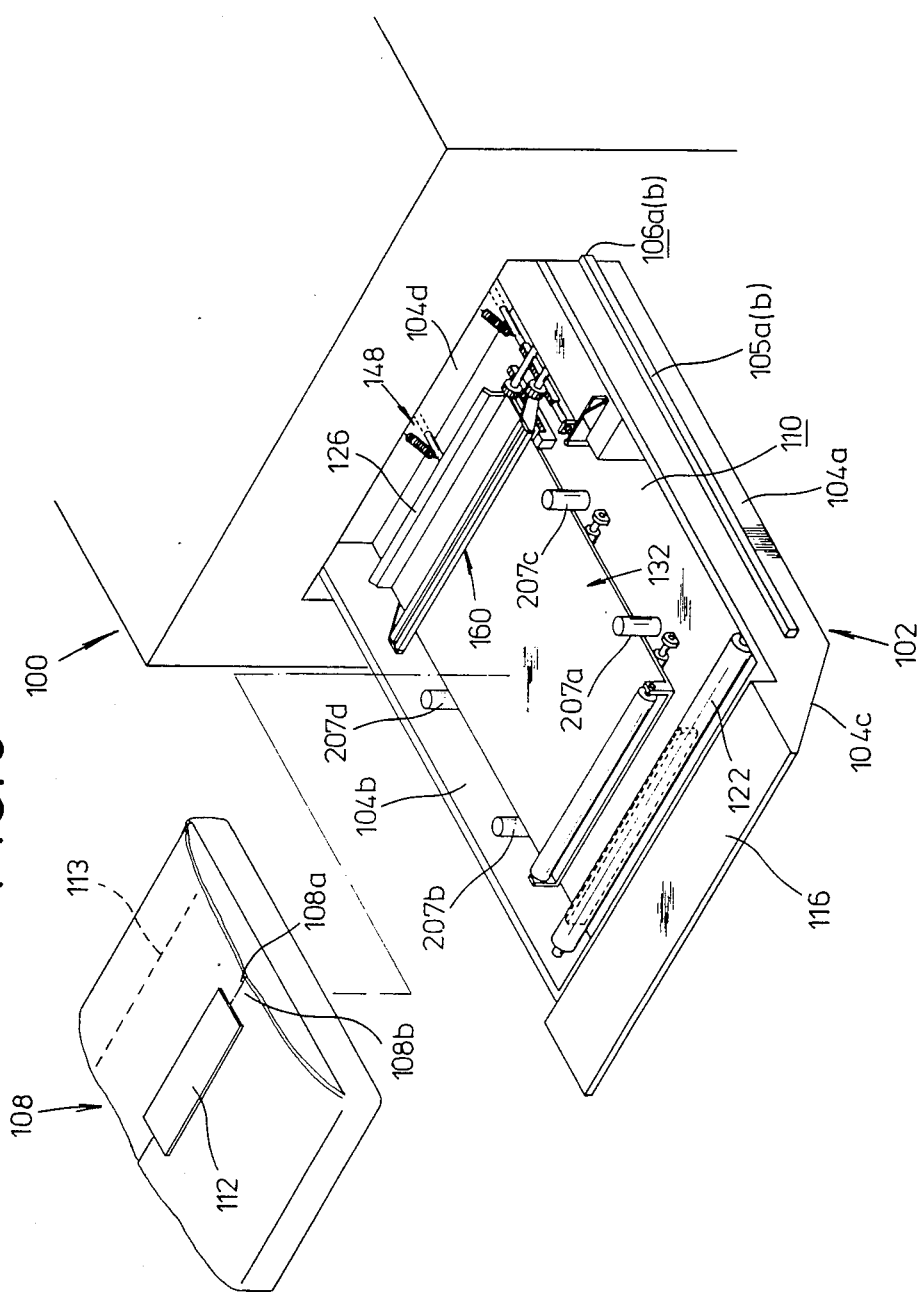
FIG. 6 is an exploded perspective view, partly omitted from illustration, of a film loading device and a film package to be mounted therein, according to another embodiment of the present invention.

FIG. 6 shows a film loading device according to another embodiment, the film loading device having a main body or housing 100 and a holder 102 removably mounted in the main body 100. The holder 102 comprises a casing composed of longitudinal side walls 104a, 104b and transverse side walls 104c, 104d. Guide ridges 105a, 105b are affixed to the side walls 104a, 104b, respectively, and slidably fitted respectively in guide grooves 106a, 106b in the main body 100. The holder 102 has a stopper (not shown) for permitting itself to be pulled out of the main body 100 over a prescribed interval and also for allowing itself to be removed from the main body 100 when desired.

The holder 102 has an opening 110 for storing a film package 108 therein. The film package 108 is of a structure different from that of the film package 100 of the previous embodiment. More specifically, the film package 108 is in the form of a bag for storing a stack of sheet films S. With the stacked sheet films S stored, the longitudinal ends 108a, 108b of the film package 108 are sealed as by welding, then folded back on the back of the sheet films S, and fastened to each other by a seal 112. It is preferable to provide a cut-out mark 113 (indicated by the broken line in FIG. 6) on the film package 108 for removing the sheet films S from the film package 108.

As shown in FIGS. 12 and 13(a) through 13(c), cardboard 115 may be disposed in the film package 108 in order to protect the sheet films S in the film package 108. The cardboard 115 holding a stack of sheet films S is accommodated in the film package 108, then the opposite ends 108a, 108b of the film package 108 are sealed as by heat sealing or welding, and a secured portion 117 is formed closely and parallel to the end 108b. The cardboard 115 is positioned near one transverse end of the film package 108, and the other transverse end thereof is folded back on the side of the photosensitive surface of the sheet films S (see FIG. 13(b)). The longitudinal opposite ends 108a, 108b are then folded back on the side where the films S will be removed, and bonded to the seal 112. The seal 112 may preferably be marked with a notice such as "SET WITH THIS SIDE UP".

As shown in FIGS. 6 and 7, the holder 102 has a grip 116 on the upper surface of a front side wall 104c thereof, the grip 116 projecting away from the opening 110. The holder 102 also has a light-shielding plate 118 extending into the opening 110. An engaging plate 118 is vertically disposed in the holder 102 in the vicinity of the front side wall 102c. A roller 122 is rotatably supported in the holder 102 between the engaging plate 120 and the light-shielding plate 118 and extends in a direction normal to the direction in which the holder 102 is pulled out.

Figure 9:
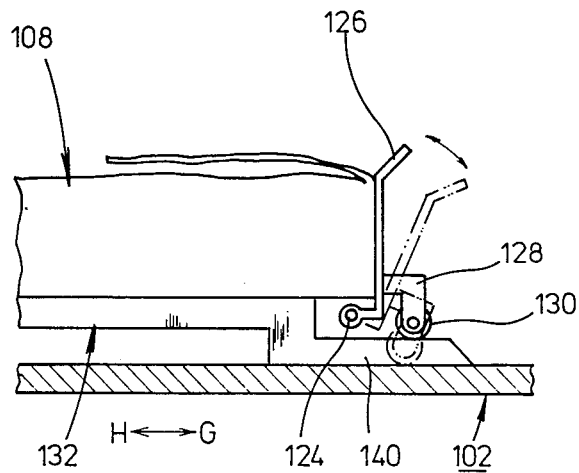
FIGS. 9 through 11 are fragmentary views of the film loading device illustrated in FIG. 6.

A stopper 126 is angularly movably supported on a support pin 124 (FIG. 9) disposed in the holder 102 closely to the side wall 104d. As shown in FIG. 9, the stopper 126 has one end fitted over the support pin 124 and is bent through about 90° to extend vertically upwardly, the stopper 126 has its opposite end inclined upwardly and horizontally. A rotatable member or roller 130 is supported on the vertical portion of the stopper 126 by means of an attachment 128.

Rotatable members or rollers 131a, 131b are disposed in the holder 102 between the engaging plate 120 and the stopper 126, with a movable base 132 positioned on the rotatable members 131a, 131b. A spring 135 (FIGS. 8(a) and 8(b)) is coupled between the bottom of the movable base 132 and the holder 102, so that the movable base 132 can be pulled in the direction of the arrow G under the tension of the spring 135. The movable base 132 has a pair of supports 136a, 136b projecting upwardly from an end thereof near the engaging plate 120, and a roller 138 is rotatably supported by and between the supports 136a, 136b.

Figure 10:
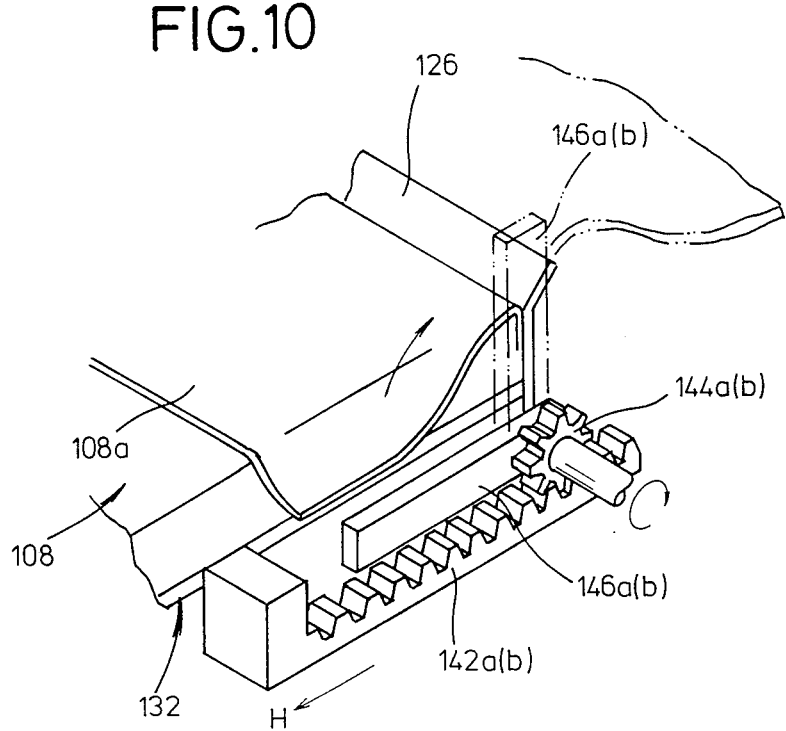

As shown in FIG. 9, the movable base 132 also has on its opposite end a foot 104 projecting outwardly and having a slanted surface engagable with the rotatable member 130 on the stopper 126. The movable base 132 also has on its opposite end an engaging member 141 projecting vertically downwardly. Racks 142a, 142b are secured to the opposite end of the movable base 132, the racks 142a, 142b projecting outwardly from the opposite sides of the movable base 132 and extending longitudinally of the movable base 132. As shown in FIG. 7 and 10, pinions 144a, 144b rotatably supported in the holder 102 are held in mesh with the racks 142a, 142b, respectively, and are fixed to ends of package folding arms 146a, 146b.

A tensioning means 148 engages the engaging member 141 of the movable base 132. The tensioning means 148 includes a rod 150 having on one end thereof a finger 152 for engaging the engaging member 141. The rod 150 extends through the side wall 104d of the movable base 132 into the main body 100 and has a flange 154 on the opposite end thereof. A spring 156 has one end coupled to the rod 150 and the other end fixed to the side wall 104d. Therefore, when the holder 102 is pulled out of the main body 100, the movable base 132 is tensioned under a relatively large tensioning force in the direction of the arrow G by the springs 156, 135.

The holder 102 houses therein a guide means 160 for engaging the film package 108 to assist in cutting off the film package 108 to be placed on the movable base 132 and for shielding the cut portion of the film package 108 from light. More specifically, as illustrated in FIG. 7, the guide means 160 includes a rod 162 having one end held by a support plate 164 erected in the holder 102 and the opposite end extending through the side wall 104d into the main body 100, there being a flange 166 on the opposite end of the rod 162. A spring 167 is coupled between the rod 162 and the side wall 104d. The rod 162 includes a rack 168 of a prescribed length held in mesh with a pinion 170 secured to a first arm 172 supported in the holder 102. First and second bars 176, 178 extend between the first arm 172 and a second arm 174 rotatably supported on the side wall 104b of the holder 102. The first and second bars 176, 178 define therebetween a relatively small gap 180 extending in the transverse direction of the holder 102.

A stopper pin 182 is mounted on the side wall 104b for engagement with the second arm 174 to position the arm members 176, 178. Although not shown, the first and second bars 176, 178 are horizontally stepped slightly with respect to each other so that the first bar 176 is positioned downwardly of the second bar 178.

As illustrated in FIG. 7, a casing 186 is disposed in the holder 102 at a corner formed by the side walls 104a, 104b, and a block 188 is disposed near one end of the casing 186. The block 188 and the casing 186 define therebetween a slot 192 (FIG. 11) in which there is accommodated a substantially triangular cutter 190. A thin light-shielding member 196 having one end supported on the holder 102 is positioned in the slot 192. The light-shielding member 196 closes a cavity 198 in the casing 186 when the cutter 190 is accommodated in the slot 192.

Figure 11:
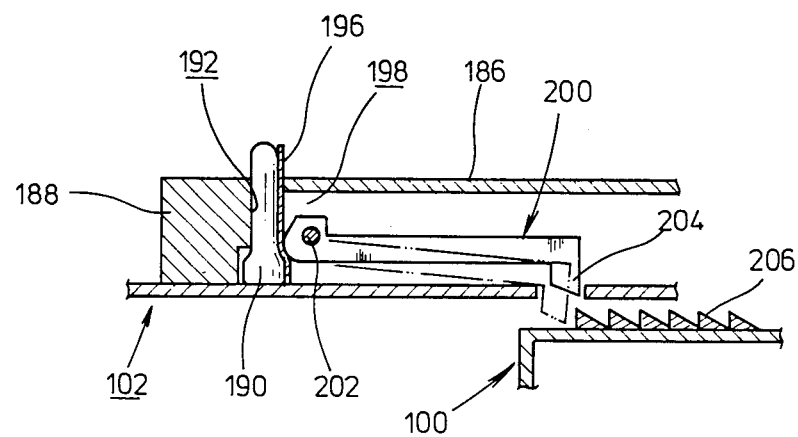
Figure 12:
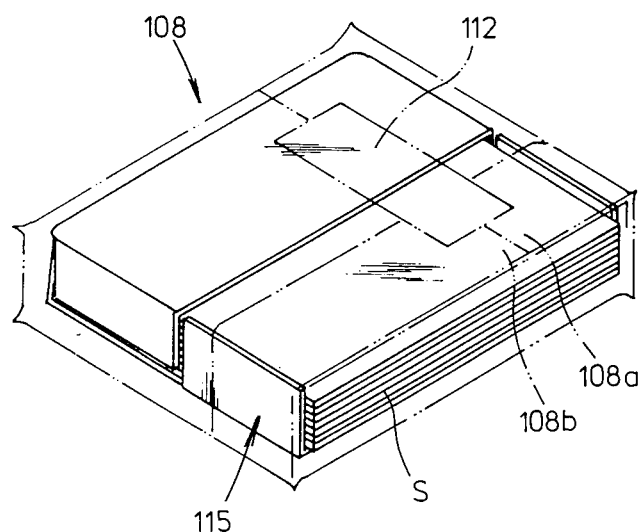
FIG. 12 is a perspective view of a film package according to still another embodiment of the present invention.
Figure 13:
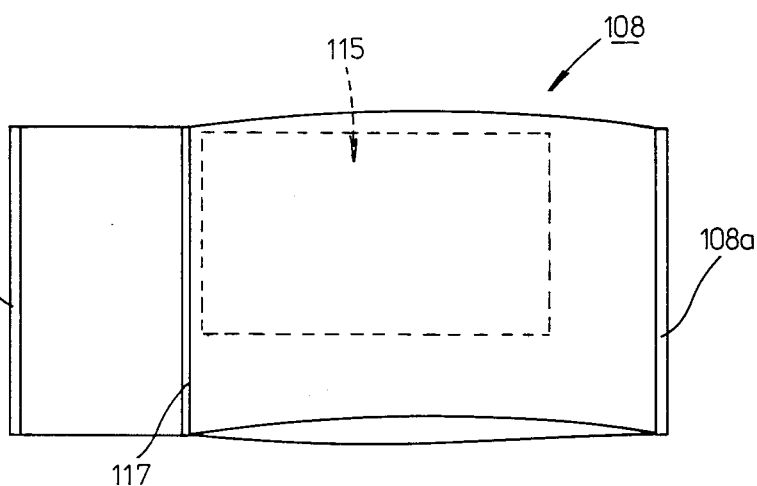
FIGS. 13(a) through 13(c) are views of the film package of FIG. 12 as it is folded.
Figure 13:
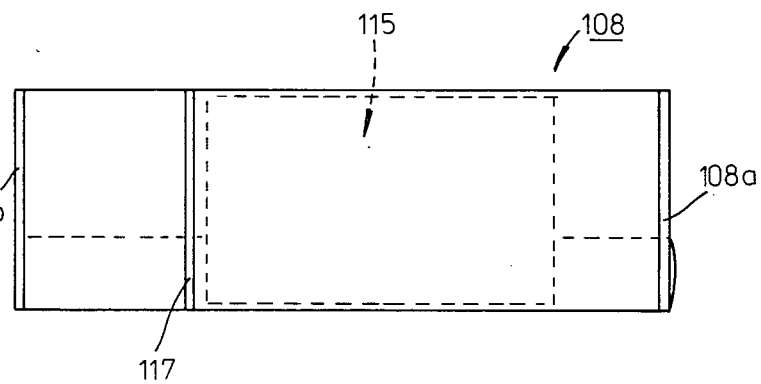
Figure 13:
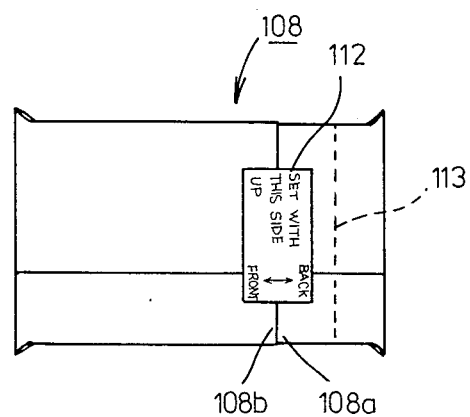

As shown in FIG. 11, a rocker arm 200 is disposed in the cavity 198 and has one end swingably supported by a support pin 202 and a finger 204 extending downwardly from the opposite end thereof. The finger 204 extends through the bottom of the holder 102 into the main body 100 in which there is disposed a saw-toothed engaging member 206 engageable by the finger 204.

First through fourth rollers 207a through 207d are rotatably mounted in the holder 102, one pair on each side of the movable base 132. The side wall 104d has a recess 209 defined in its upper surface for the stopper means 60 to engage in.

As shown in FIG. 8(b), a light-shielding roller 208 is disposed in the main body 100 for engagement with the light-shielding plate 118 of the holder 102 to keep the interior of the main body 100 shielded from extraneous light, the light-shielding roller 208 being displaceable in the direction of the arrow through a resilient member. Another roller 210 is also disposed in the main body 100 in spaced relation to the light-shielding roller 208. The roller 210 can coact with the roller 138 supported on the movable base 132 to separate a sheet film S from the film package 108. The main body 100 and the grip 116 of the holder 102 define a gap 212 therebetween for the insertion of the film package 108 therethrough. The main body 100 has a wall 214 for engaging the flanges 154, 166 on the rods 150, 162 of the tensioning means 148 and the guide means 160.

The main body 100 also has the stopper means 60 and the sheet feeding mechanism 80 which are the same as those of the first embodiment and hence will not be described in detail with their components being denoted by identical reference numerals.

In operation, when the holder 102 is pulled out of the main body 100, the rod 150 of the tensioning means 148 is spaced from the wall 214, and tensioned in the direction of the arrow G with respect to the holder 102 under the tension of the spring 156. Therefore, the finger 152 of the rod 150 engages the engaging member 141 of the movable base 132 to tension the latter in the direction of the arrow G. Thus, the movable base 132 is displaced in the direction of the arrow G under the tension of the spring 156 and the spring 135 coupled to the movable base 132 until the end of the movable base 132 abuts against the stopper 126 (FIG. 8(a)).

At this time, the rod 162 of the guide means 160 is also spaced from the wall 214. As a result, the rod 162 is displaced in the direction of the arrow G under the tension of the spring 167, and the pinion 170 meshing with the rack 168 of the rod 162 is rotated in the direction of the arrow in FIG. 7. Therefore, the first arm 172 fixed to the pinion 170 is turned in the direction of the arrow, and the first and second bars 176, 178 joined to the first and second arms 172, 174 are angularly moved toward the movable base 132 until the second arm 174 engages the stopper pin 182, whereupon the first and second bars 176, 178 are positioned.

As the movable base 132 is further displaced in the direction of the arrow G with respect to the holder 102, the pinions 144a, 144b are rotated in the direction opposite to the direction of the arrow in FIG. 10 by the racks 142a, 142b of the movable base 132. Therefore, the arms 146a, 146b connected to the respective pinions 144a, 144b are directed longitudinally of the movable base 132.

Then, the film package 108 is placed on the movable base 132 in the holder 102. The distance between the stopper 126 and the roller 138 is selected to be slightly smaller than the length of the film package 108 so that when the film package 108 is put on the movable base 132, the film package 108 can securely be positioned on the movable base 132.

Then, the cutter 190 stored in the slot 192 in the holder 102 is taken out and moved along the gap 180 between the first and second bars 176, 178 to cut off the film package 108 along the cut-out mark 113 indicated by the broken line in FIG. 6. At this time, since the first and second bars 176, 178 depresses the film package 108 sufficiently, the film package 108 can be kept in a light-shielded condition after it has been cut off.

After the film package 108 has been cut off, the cutter 190 is stored back into the slot 192. Inasmuch as the cutter 190 presses the light-shielding member 196 along the shape of the cutter 190, the rocker arm 200 is angularly moved upwardly about the pin 202. Therefore, the finger 204 of the rocker arm 200 is disengaged from the engaging member 206 in the main body 100, so that the holder 102 can be displaced into the main body 100 (see FIG. 11).

Then, the end 108b of the film package 108 and a portion of the end 108a which has been cut off are folded back toward the grip 116, after which the holder 102 is displaced into the main body 100. The flange 154 of the rod 150 of the tensioning means 148 is brought into abutment against the wall 214 of the main body 100, and then the rod 150 is moved in the direction of the arrow H with respect to the holder 102 against the tension of the spring 156. As a consequence, the finger 152 of the rod 150 is spaced from the engaging member 141 of the movable base 132, whereupon the movable base 132 is only subjected to the tensioning force of the spring 156.

The flange 166 of the rod 162 of the guide means 160 is also held against the wall 214 to displace the rack 168 in the direction of the arrow H with respect to the holder 102. The pinion 170 meshing with the rack 168 is now rotated in the direction opposite to the direction of the arrow thereby to swing the first and second arms 172, 174 away from the movable base 132.

The holder 102 is now placed in the main body 100 in the above manner. Then, the stopper means 60 is actuated to secure the holder 102 in the main body 100. The exposed end of the film package 108 is pulled in the direction of the arrow H through the gap 212 between the holder 102 and the main body 100. The movable base 132 on which the film package 108 is placed is now displaced in the direction of the arrow H against the tension of the spring 135 until the movable base 132 abuts against the engaging plate 120 (FIG. 8(b)).

Since the foot 140 (FIG. 9) of the movable base 132 is displaced in the direction of the arrow H to cause the rotatable member 130 to disengage from the foot 140, the stopper 126 is angularly moved downwardly about the support pin 124 thereby to release the film package 108. The pinions 144a, 144b are rotated in the direction of the arrow by the racks 142a, 142b of the movable base 132, the arms 146a, 146b engage the cut end which has been folded back over the film package 108 and are swung to cause the engaged cut end to extend horizontally.

As the film package 108 is pulled out in the direction of the arrow H, the sheet films S stacked in the film package 108 are left on the movable base 132 by rollers 210, 138.

When the film package 108 is entirely pulled out by being guided by the rollers 207a through 207d, the movable base 132 is displaced in the direction of the arrow G under the tension of the spring 135, and at the same time the rotatable member 130 rolls up the slanted surface of the foot 140 until it reaches the solid-line position shown in FIG. 9. As a consequence, the ends of the sheet films F on the movable base 132 are engaged and positioned by the stopper 126.

Then, the sheet feeding mechanism 80 is operated to attract the sheet films S, one by one, stacked on the movable base 132, and feed them to an image recording mechanism (not shown).

It can readily be understood that the holder 102 may be provided with the same shutter as the shutter associated with the holder 34 of the preceding embodiment.

Figure 14:
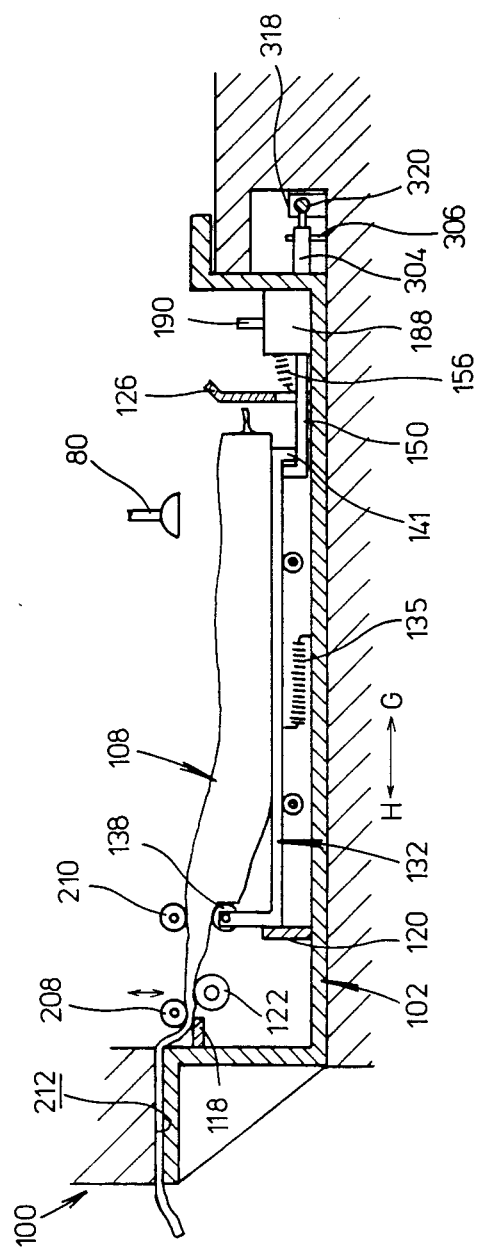
FIG. 14 is a vertical cross-sectional view, partly omitted from illustration, of a film loading device according to yet still another embodiment of the present invention.
Figure 15:
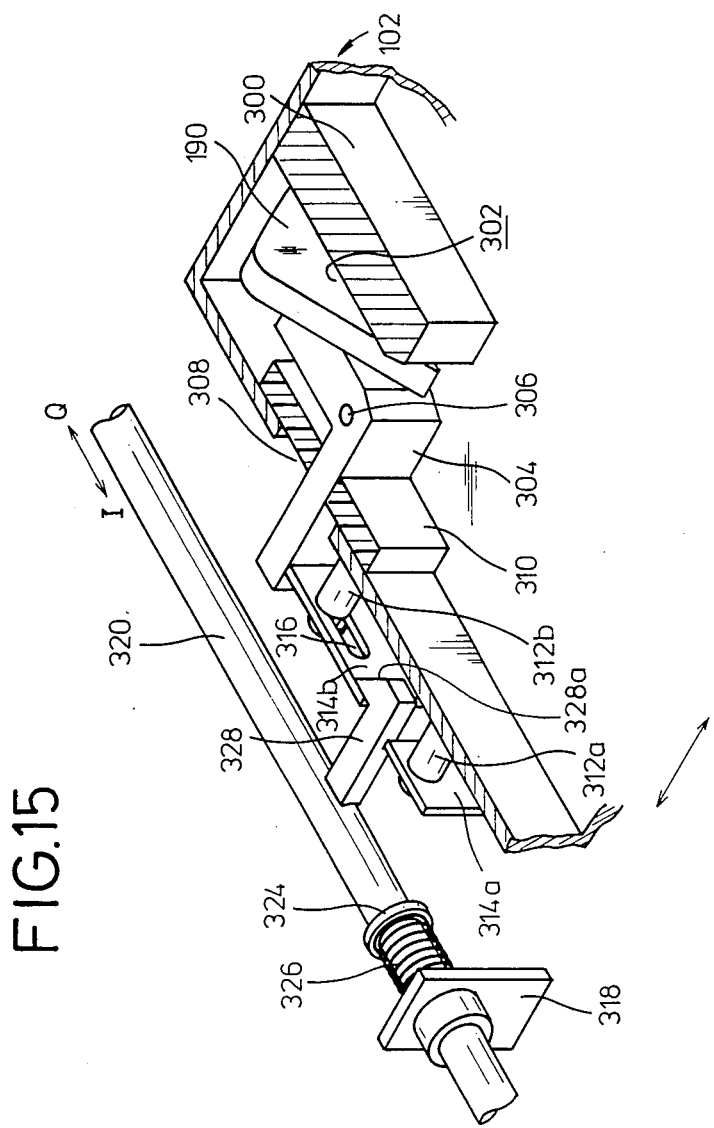
FIG. 15 is a fragmentary perspective view, partly cut away, of the film loading device shown in FIG. 14.
Figure 16:
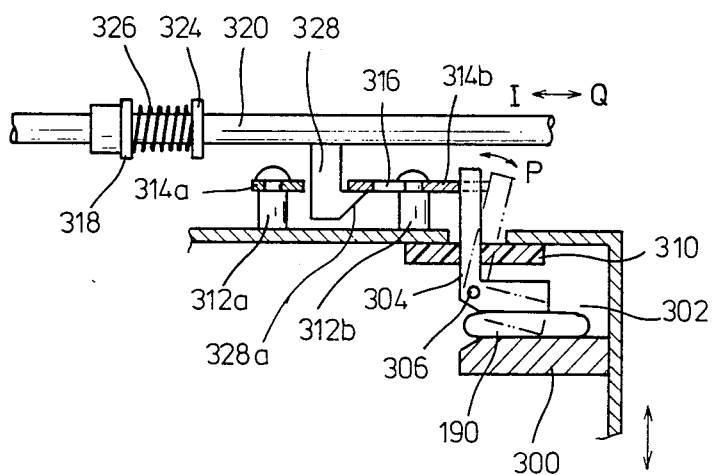
FIG. 16 is a fragmentary plan view, partly in cross section, of the film loading device of FIG. 15.

A film loading device according to still another embodiment is illustrated in FIGS. 14 through 16. Those parts which are identical to those in the previous embodiments are denoted by identical reference numerals, and will not be described in detail.

As shown in FIG. 15, a casing 300 is disposed in the holder 102 at a corner thereof, the casing 300 having a slot 302 for accommodating the cutter 190 therein. An L-shaped lever 304 has one end disposed in the slot 302 and is angularly movably supported at its bent portion on a pin 306 erected in the holder 102. The other end of the lever 304 extends through an opening 308 defined in the holder 102 into the main body 100. A spongy rubber member 310 is disposed in the holder 102 and closes the opening 308 in light-shielding relation.

The holder 102 supports on a wall thereof post-like supports 312a, 312b on which there are mounted a first fixed guide plate 314a and a second movable guide plate 314b. The second guide plate 314b is longer than the first guide plate 314a and has an oblong hole 316, the second guide plate 314b abutting against the outer end of the lever 304.

A rod 320 is movably supported by a support plate 318 disposed in the main body 100, the rod 320 extending perpendicularly to the direction in which the holder 102 is pulled out. The rod 320 has a flange 324 near the support plate 318, with a coil spring disposed around the rod 320 between the support plate 318 and the flange 324. The rod 320 also has an engaging finger 328 projecting toward the holder 102 and having a distal end projecting toward the second guide plate 314b and having a slanted surface 328a. The rod 320 can be pushed axially in the direction of arrow I by an actuator (not shown).

When the holder 102 is pushed into the main body 100 with the cutter 190 not disposed in the slot 302, the engaging finger 328 of the rod 320 enters between the first and second guide plates 314a, 314b. Therefore, the second guide plate 314b is pushed in the direction of the arrow Q as its end slides along the engaging finger 328. At this time, the lever 304 held against the second guide plate 314b is angularly moved about the pin 306, so that the second guide plate 314b is moved in the direction of the arrow P through the oblong hole 316.

Since the second guide 314b is moved in the direction of the arrow P, the engaging finger 328 is not engaged by the second guide plate 314b. Therefore, upon releasing the holder 102 from the pushing forces at this time, the holder 102 is forced to project out of the main body under the tension of the spring 167 coupled to the rod 162. Thus, the operator cannot pull the film package 108.

By placing the cutter 190 in the slot 302, the lever 304 engaging the second guide 314b at one end has its opposite end held against the cutter 190, so that the lever 304 is no longer angularly movable. When the holder 102 is pushed into the main body 100, the slanted surface 328a of the engaging finger 328 abuts against the second guide plate 314b, and the rod 320 is diplaced in the direction of the arrow I against the resiliency of the coil spring 326 since the lever 304 is prevented from swinging. After the engaging finger 328 enters between the first and second guide plates 314a, 314b, its distal end is engaged by the second guide plate 314b (see FIGS. 15 and 16). Consequently, the holder 102 is securely held in the main body 100.

For pulling the holder 102 out of the main body 100, the non-illustrated actuator is operated to push the rod 320 in the direction of the arrow I to separate the engaging finger 328 from the second guide plate 314b.

Figure 17:
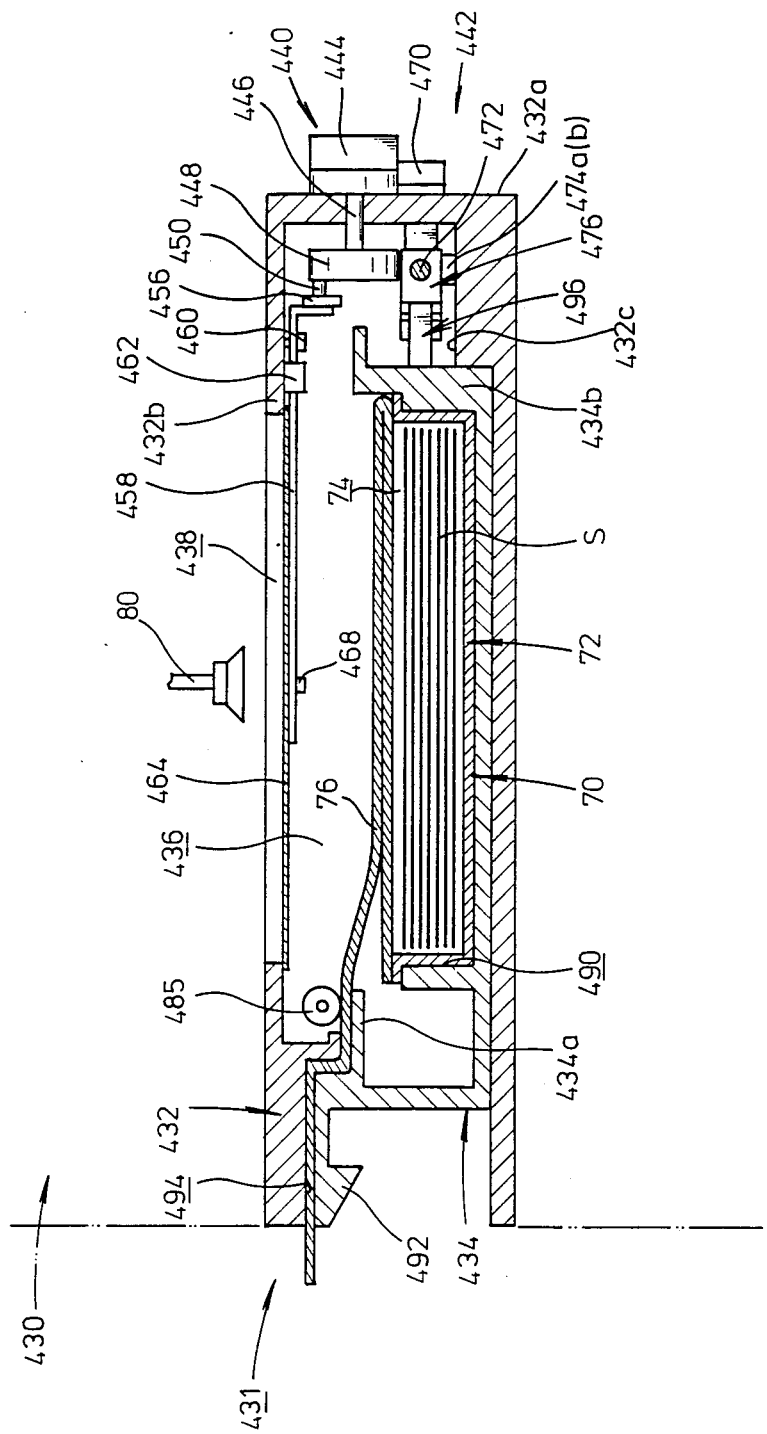
FIG. 17 is a vertical cross-sectional view, partly omitted from illustration, of a film loading device according to a further embodiment of the present invention.
Figure 18:
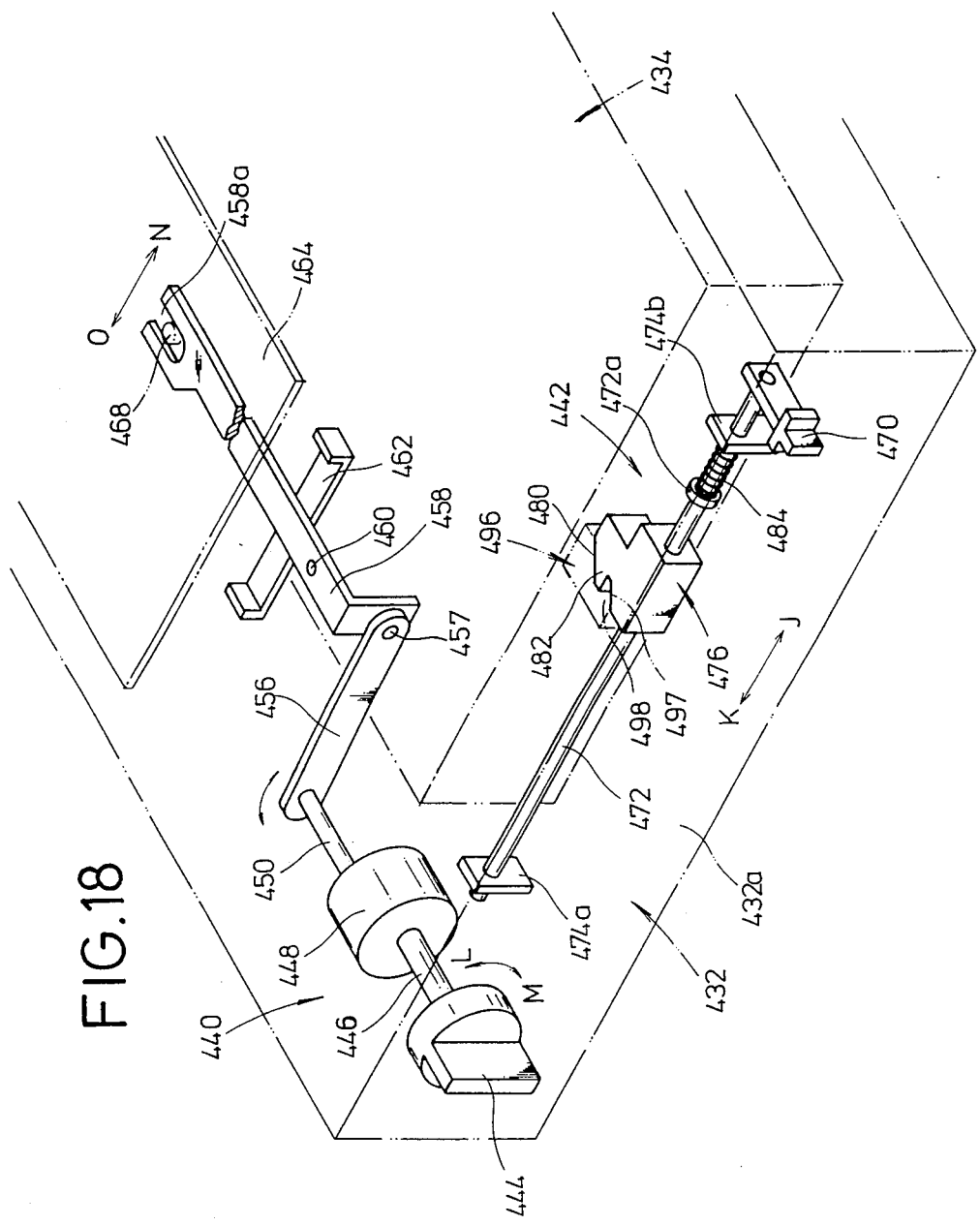
FIG. 18 is a schematic perspective view of an outer casing of the film loading device illustrated in FIG. 17.
Figure 19:
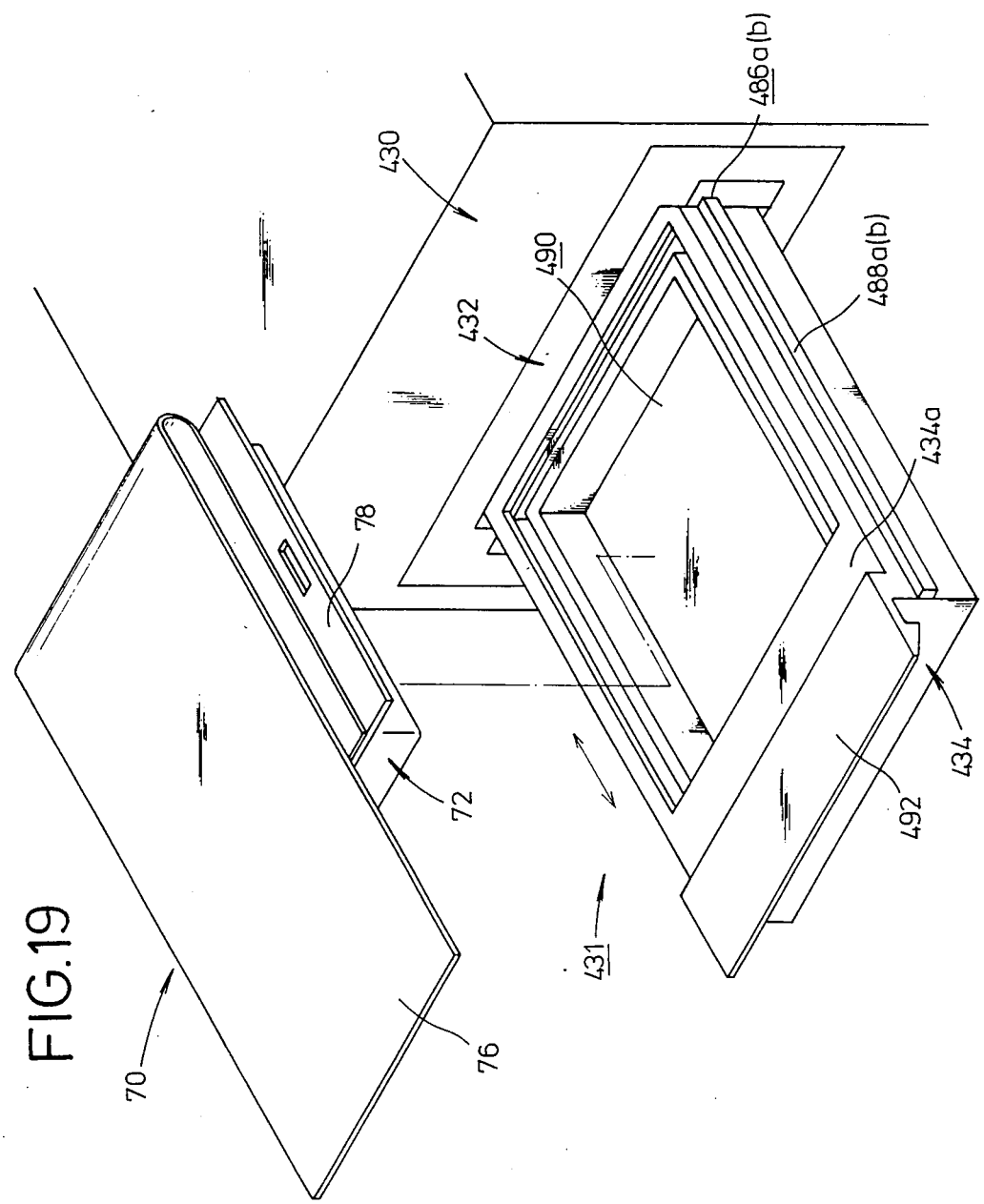
FIG. 19 is an exploded perspective view of a main body and an inner casing of the film loading device shown in FIGS. 17 and 18.

FIGS. 17 through 19 show a film loading device according to a further embodiment of the present invention. In this embodiment, the film loading device has a first casing detachably mounted in a main body and a second casing housing a film package covered with a flexible cover and removably mounted in the first casing. More specifically, a main body 430 has a film loader 431 basically comprising an outer casing 432 detachably mounted in the main body 430 and an inner casing 434 removable from the outer casing 432.

As illustrated in FIG. 17, the outer casing 432 has a chamber 436 defined therein for accommodating the inner casing 434 and an opening 438 defined in its upper portion and held in communication with the chamber 436. A shutter opening/closing mechanism 440 is mounted in the outer casing 432 for opening and closing the opening 438, and a locking mechanism 442 is disposed in the outer casing 432 for securely positioning the inner casing 424 in the chamber 436.

More specifically, as shown in FIGS. 17 and 18, the shutter opening/closing mechanism 440 includes a first angularly movable control member 444 disposed on a side wall 432a of the outer casing 432 which faces into the main body 430. The first control member 444 is fixed to one end of a rotatable shaft 446 with its opposite end joined to a cylindrical member 448. A pin 450 is eccentrically affixed to the cylindrical member 448 and coupled to one end of a plate-like arm 456. The other end of the arm 456 is coupled to a bent lever 458 through a pin 457, the lever 458 being angularly movable about a support shaft 460 with respect to an upper wall 432b of the outer casing 432. The lever 458 is supported on the upper wall 432b by a channel-shaped retainer 426 fixed thereto. The lever 458 has on an end thereof an engaging portion 458a having a semicircular oblong hole defined therein and held in engagement with an engaging pin 468 of a shutter 464. Therefore, when the first control member 444 is turned, the shutter 464 is moved by the lever 458 to open and close the opening 438 of the outer casing 432.

The locking mechanism 442 comprises a second control member 470 mounted on the side wall 432a of the outer casing 432. The second control member 470 is fixed to one end of a rod 472 extending along the side wall 432a. The rod 472 is supported by a pair of support plates 474a, 474b mounted vertically on the bottom wall 432c of the outer casing 432. An engaging member 476 is fixed to the rod 472 near the support plate 474b and has a slanted surface 480 on an end thereof projecting toward the inner casing 434, the slanted surface 480 having a finger 482 on an end thereof. The rod 472 also has a flange 472a disposed between the engaging member 476 and the support plate 474b. The rod 472 is normally urged in the direction of the arrow K by a coil spring 484 disposed around the rod 472 between the flange 472a and the support plate 474b, as shown in FIG. 18. As shown in FIG. 17, a roller 485 is disposed in the chamber 436 of the outer casing 432 and normally urged by a spring (not shown) to be pressed against an upper wall 434a of the inner casing 434 for keeping the chamber 436 in a light-shielded condition. The outer casing 432 has a pair of guide grooves 486a, 486b defined in opposite sides thereof. The inner casing 434 has guide ridges 488a, 488b disposed on opposite side walls thereof and slidably fitted in the guide grooves 486a, 486b, respectively, so that the inner casing 434 can be inserted into and taken out of the outer casing 434 through sliding engagement of the guide ridges 488a, 488b in the guide grooves 486a, 486b.

The inner casing 434 has an opening 490 for accommodating a film package (described later) therein. The upper wall 434a is disposed on an upper end of the inner casing 434 and extends into the opening 490, with the roller 485 being held in rolling engagement with the upper wall 434a. A grip 492 projects outwardly from the upper wall 434a. The grip 492 and the upper wall 434a, and the outer casing 432 define therebetween a gap 494 for the insertion therethrough of a cover of the film package. An engaging member 496 is fixed to a side wall 434b of the inner casing 434. The engaging member 496 has a slanted surface 497 and a finger 498 which are complementarily engageable with the finger 482 and the slanted surface 480 of the engaging member 476 of the outer casing 482. It is preferable to provide a stopper means (not shown) for preventing the inner casing 434 from being pulled out of the outer casing 432 excessively.

The film package to be placed into the film loading device of the embodiment shown in FIGS. 17 through 19 is identical to the film package 70 shown in FIG. 3.

A process of putting the film package 70 into the film loading device will be described below.

First, the inner casing 434 is taken out of the outer casing 432, and then the film package 70 is put into the opening 490, the film package 70 containing a stack of film sheets S. The film access opening is closed by the cover 76, and the end of the cover 76 projects outwardly while being held against the upper wall 434a and the grip 492.

Then, the inner casing 434 is displaced into the outer casing 432 while the guide ridges 488a, 488b are being slid in and along the guide grooves 486a, 486b until the engaging member 496 secured to the inner casing 434 engages the engaging member 476 of the locking mechanism 422. As the inner casing 434 is further pushed in, the slanted surfaces 480, 497 of the engaging members 476, 496 slidingly engage each other to cause the engaging member 476 to be displaced with the rod 472 in the direction of the arrow J against the bias of the coil spring 484. When the fingers 482, 498 at the ends of the slanted surfaces 480, 497 engage each other, the engaging member 476 is displaced with the rod 472 in the direction of the arrow K under the bias of the coil spring 484, so that the inner casing 434 is fixedly coupled to the outer casing 432 by the locking mechanism 442.

The end of the cover 476 extending over the upper wall 434a of the inner casing 434 is sandwiched between the roller 485 and the upper wall 434a under the resiliency of the spring (not shown), and is exposed out through the gap 494 between the outer casing 432 and the grip 492. Therefore, by gripping and pulling the exposed end of the cover 76 away from the main body 430, the cover 76 is peeled off the upper surface of the tray 72 to open the film access opening in the main body 430. Since the inner casing 434 is coupled to the outer casing 432 by the locking mechanism 442, the inner casing 434 is prevented from being removed out of the outer casing 432 when the cover 76 is peeled off. The roller 485 in the outer casing 432 is pressed against the upper wall 434a of the inner casing 434 under the resiliency of the non-illustrated spring, so that no extraneous light enters the chamber 436 through the gap 494 to keep the sheet films S shielded from light even after the cover 76 has been removed from the main body 430.

Then, the shutter opening/closing mechanism 440 is operated. As shown in FIG. 18, when the first control member 444 is rotated in the direction of the arrow L through a driver (not shown) in the main body 430, the cylindrical member 448 is also rotated in the direction of the arrow L by the shaft 446 fixed to the first control member 444. The arm 456 is angularly moved by the pin 450 joined eccentrically to the cylindrical member 448, thus turning the lever 458 in the direction of the arrow N about the support shaft 460. Therefore, the shutter 464 coupled by the pin 468 to the engaging portion 458a of the lever 458 is slid in the direction of the arrow N to open the opening 438 of the outer casing 432 in the main body 430. The shutter 464 remains in the open position after the opening 438 has once been opened, so that it is not necessary to open the shutter 464 each time the film package 70 is inserted.

The sheet feeding mechanism 80 in the main body 430 is actuated to feed the sheet films S in the film package 70 one by one to the non-illustrated image recorder.

After all of the sheet films S have been fed from the film package 70, the locking mechanism 442 is operated by a driver (not shown) in the main body 430. More specifically, as shown in FIG. 18, when the second control member 470 is pushed in the direction of the arrow J, the rod 472 fixed to the second control member 470 is axially displaced in the direction of the arrow J against the resiliency of the coil spring 484 with the result that the engaging members 476, 496 are disengaged from each other. The grip 472 is pulled to take the inner casing 434 away from the main body 430, so that the inner casing 434 is pulled out of the outer casing 432.

The empty film package 70 is removed from the inner casing 434, after which a new film package 70 containing a stack of sheet films S is inserted into the main body 432 in the same process as described above.

When the sheet films S in the film package 70 are attracted and fed by the sheet feeding mechanism 80, some sheet films S tend to stick together and be taken out together due for example to static electricity. Further, the image recorder (not shown) may malfunction and need to be repaired. In such an occasion, remaining sheet films S in the film package 70 can be taken out of the main body 430 while kept in a light-shielded condition, in order to separate the sticking sheet films S or repair the image recorder.

More specifically, the sheet feeding mechanism 80 is inactivated and displaced away from the outer casing 432. Then, the main body 430 is operated to rotate the first control member 444 of the shutter opening/closing mechanism 440 in the direction of the arrow M. The arm 456 is turned through the shaft 446, the cylindrical member 448, and the pin 450 to cause the lever 458 to turn in the direction of the arrow O about the support shaft 460. The shutter 464 is slid in the direction of the arrow O through the engaging pin 468 engaging the engaging portion 458a to close the opening 438 of the outer casing 432. A fixing means (not shown) in the main body 430 is released to allow the outer and inner casings 432, 434 to be removed together from the main body 430. The sheet films S in the film package 70 stored in the inner casing 434 are shielded from light and prevented from exposure to extraneous light.

Then, the operator pushes the second control member 470 in the direction of the arrow J in a dark room, and thereafter pulls the inner casing 434 out of the outer casing 432 to separate the sheet films S from each other in the inner casing 434. Thereafter, the inner casing 434 is placed in the outer casing 432, and the inner and outer casings 434, 432 are set in the main body 430. Then, the sheet films S are fed one by one from the film package 70 in the manner described above. Alternatively or at the same time, the main body 430 can be repaired while the sheet films S stored in the outer and inner casings 432, 434 are out of the main body 430 in a light-shielded condition.

Since the inner casing 434 is securely locked in the outer casing 432 by the locking mechanism 442, the inner casing 434 will not accidentally be pulled out of the outer casing 432 while the sheet films S are being fed from the film package 70. Accordingly, the sheet feeding mechanism 80 is prevented from being damaged since the inner casing 434 remains immovable during operation of the sheet feeding mechanism 80.

With the arrangement of the present invention, as described above, the opposite ends of a bag-like light-shielding member containing a plurality of stacked sheet films are folded back on one surface and joined together by a seal, thus providing a film package. The film package is placed in a holder, and one end thereof is cut off and extended out of the holder. By storing the holder in a main device body and pulling out the film package, the sheet films can easily and quickly be loaded in the main body. Therefore, the sheet films can efficiently be loaded, and the film package is quite easy to operate on. Since the opposite ends of the film package are securely joined to each other, they do not hang outwardly, and hence the film package is easy to handle. When the film package is cut off, no debris is produced and hence should be processed. As a result, the film loading process is highly easy and efficient.

The holder is removable from the main body. The film package with a stack of sheet films stored therein is placed in the holder, which is then inserted into the main body, after which the film package is opened. Consequently, no conventional dedicated magazine is used, resulting in facilitated film loading operation. It is also possible to load sheet films in a bright environment. Therefore, the film loading device of the invention is highly efficient and easy to work with. By mounting a shutter in the holder, the holder can be removed from the main body while being shielded from light even if unexposed sheet films remain in the holder, so that the main body can be maintained or serviced while the holder is thus being removed.

According to the present invention, furthermore, a receiver on which the film package with a stack sheet films therein is placed is provided movably with respect to the holder. There is also provided a light-shielding member which engages the film package when cutting off the film package, thus shielding the cut-off portion from light. By pushing the movable receiver toward the light-shielding member through a resilient member, extraneous light is prevented from entering the film package through the cut-off portion thereof upon closure of the light-shielding member. Especially when the film package is loaded in a bright condition, application of extraneous light through the cut-off portion of the film package is effectively avoided, so that the film package can reliably be loaded with utmost ease. For taking out the film package, the movable receiver and the light-shielding member are relatively moved away from each other, thus smoothly taking out the film package.

There is also provided according to the present invention a casing or housing in the holder for accommodating a cutter which cuts off the film package with a stack of sheet films stored therein. The holder can be placed into the main body when the cutter is disposed in the casing. When the cutter is located out of position, the holder cannot be put into the main body. Thus, there is no danger for the cutter which is left out of position to project into the main body and interfere with a sheet feeding mechanism therein. The cutter is also prevented from being inadvertently left in the main body. Therefore, the film loading operation is highly efficient, and the film loading device is quite easy to work with.

Further according to the present invention, there is also provided a folding means for folding the cut end of the film package in a direction opposite to the direction in which the film package is pulled out, the folding means being disposed in the holder in which the film package with a stack of sheet films stored therein is to be placed. After the film package has been cut out and when the film package is to be taken out, the cut end of the film package is folded back by the folding means in the direction opposite to the film package pulling direction. The cut end of the film package is thus prevented from being subjected to unwanted resistance, or from being damaged. The film package is particularly prevented from being damaged, and hence no damaged portion of the film package will be left in the main body and will interfere with the sheet feeding operation. The film package can be easily and reliably be taken out of the main body. As a result, the film package can smoothly be taken out. The film loading device is highly easy to work with also in this aspect.

Moreover, there is provided a swingable guide means in the holder for placing therein the film package with a stack of sheet films stored therein. The film package can easily be cut off simply by placing the film package in the holder and moving the cutter along the guide means. Heretofore, it was the practice for the operator to grip the end of the film package and cut off the end with scissors or the like. However, the film package can be cut off much more simply according to the present invention.

Extraneous light is prevented from entering the film package via the cut-off portion thereof through the guide means. The films can be loaded especially in a bright environment. By swinging the guide means in a direction away from the film package when the holder is to be placed into the main body, the film package can smoothly be pulled out.

Although certain preferred embodiments have been shown and described, it should be understood that many changes and modifications may be made therein without departing from the scope of the appended claims.

What is claimed is:

1. A device for loading a film package having a removable cover and storing a stack of sheet films therein, comprising a main body; a holder for placing said film package therein, said holder being partially, slidably removable from said main body such that said holder is partially retained in said main body to facilitate the loading of said film package in the holder; and roller means operable with said holder for shielding said film package from light when said cover is removed therefrom, the arrangement being such that said cover is able to be removed from said film package while said film package is disposed in said main body and said holder is retained in said main body, said holder being drawn substantially outwardly from said main body.

2. A device according to claim 1, further including a shutter insertable in said holder, the arrangement being such that said holder can be removed from said main body while the film package as it is open is shielded from light by said shutter.

3. A device according to claim 2, wherein said holder has a shutter insertion slot defined therein, further including at least one light-shielding member disposed closely to said shutter insertion slot and pressable against a wall of said holder through a resilient member for closing the interior of said holder.

4. A device according to claim 1, wherein said roller means comprises a roller operable with said holder for shielding said film package from light as it is open in said main body.

5. The device of claim 3, wherein said holder has a receiver for storing the film package, said receiver being movable back and forth in a direction in which said film package can be pulled out, a light-shielding member pressable against said film package, the arrangement being such that when cutting off an end of said film package, the light-shielding member is pressed against the end of the film package to prevent extraneous light from entering the film package through the cut-off portion, said receiver and said light-shielding member being relatively movable away from each other to prevent said light-shielding member from interfering with the film package as it is pulled out.

6. A device according to claim 5, wherein said light-shielding member is disposed in said holder, said receiver being tensioned under the tension of a resilient member in a direction opposite to said direction so as to abut against said light-shielding member, further including tensioning means engaging said receiver and coacting with the main body of the device, the arrangement being such that the film package is placed on the receiver and the end of the film package on the receiver is pressed against the light-shielding member through the resilient member and the tensioning means, and when cutting off the film package, the cut-off portion thereof is shielded from light by said light-shielding member, and when the holder or is stored into the main body, the receiver is released from the tensioning action by said tensioning means and the film package is pulled to displace the receiver for spacing the light-shielding member from said film package.

7. A device according to claim 6, wherein said tensioning means includes a rod having one end engaging said receiver and an opposite end extending into the main body, said rod being pushed by a resilient member in the direction opposite to the direction in which the film package can be pulled out, the arrangement being such that when pulling the holder out of the main body, said receiver is pressed against the light-shielding member by the resilient member coupled to the receiver and the resilient member engaging said rod, and when storing the holder into said main body, said rod engages in said main body and is disengaged from said receiver, and only said resilient member coupled to said receiver acting on the receiver.

8. A device according to claim 5, further including guide means angularly displaceable in coaction with said holder, the arrangement being such that the film package is placed on said receiver and a light-shielding member of said guide means is held against said film package along the direction in which the film package is cut off, and when cutting off the film package along said light-shielding member, the cut-off portion is shielded from light through said light-shielding member, and when storing the holder or magazine into the main body, said main body and said guide means coact with each other to swing said light-shielding member away from said film package.

9. The device of claim 1, further comprising cutter means for cutting off said film package at a prescribed portion thereof in order to allow the sheet films to be loaded from the film package in a bright environment, and a storage portion disposed in said holder for accommodating said cutter means therein.

10. A device according to claim 9, wherein said storage portion substantially comprises a slot defined between first and second blocks disposed in said holder or magazine, said cutter means being fittable in said slot.

11. A device according to claim 10, further including a thin guide member disposed in said slot for guiding said cutter means into said slot.

12. A device according to claim 9, wherein said holder is removable from a main body of the device, further including fixing means for allowing said holder to be stored in said main body when a cutter for cutting the film package is disposed in a prescribed position in said holder.

13. A device according to claim 12, wherein said fixing means includes an arm swingably supported on said holder, said arm having one end positioned at a slot defined in said holder for locating said cutter therein and an opposite end engageable with an engaging member disposed in said main body, the arrangement being such that when said cutter is accommodated in said slot, said one end of the arm is pressed by said cutter to cause said opposite end of the arm to be spaced from said engaging member for allowing the holder to be stored into said main body, and when said cutter is taken out of said slot, said opposite end of the arm engages said engaging member to prevent said holder from being displaced.

14. A device according to claim 13, wherein said engaging member in said main body substantially comprises a plurality of teeth, said opposite end of the arm being engageable with one of said teeth at a time.

15. A device according to claim 12, wherein said fixing means comprises a lever having one end disposed at a slot for locating said cutter therein, a guide plate engaging the opposite end of said lever and displaceable in a prescribed direction, and a rod disposed in said main body and having a finger engageable with said guide plate, said rod being displaceable in said prescribed direction, the arrangement being such that the cutter is disposed in said slot to fix said lever and said holder is displaced into said main body to cause said finger to engage said guide plate to displace said rod for thereby bringing said finger into engagement with said guide plate to store said holder fixedly in said main body, and when said cutter is taken out of said slot, said finger pushes said guide plate to prevent said finger and said guide plate from engaging each other.

16. The device of claim 1, further comprising cutter means for cutting off said film package at a prescribed portion thereof in a bright environment, and guide means disposed in said holder for guiding said cutter means and preventing extraneous light from entering said film package through a cut-off end at said prescribed portion.

17. A device according to claim 16, wherein said guide means substantially comprises a pair of first and second bars coupled between a pair of swingable arms and spaced from each other, the arrangement being such that when the film package is placed in said holder, said first and second bars extend in a direction in which the film package is to cut off and engage the film package, and the cutter means is inserted between said bars to cut off the film package while shielding the cut end of the film package from light with said bars, and when said holder is stored into a main body of said device, said bars are displaced away from the film package so as to stay out of interference with removal of said film package.

18. A device according to claim 17, further including a pinion coupled to at least one of said arms, a rod having a rack meshing with said pinion and projecting from said holder or magazine into said main body, and a resilient member for pulling said rod into said main body, the arrangement being such that when storing said holder into said main body, said rod engages said main body to swing the arms through said rack and said pinion for thereby moving said first and second bars supported on said arms away from said film package.

19. The device of claim 1, further comprising folding means mounted in said holder for engaging a cut end of said film package, the arrangement being such that after said film package has been cut off at a prescribed portion thereof, a cut end is folded by said folding means in a direction opposite to the direction in which the film package is pulled out.

20. A device according to claim 19, wherein said folding means substantially comprises a swingable arm disposed on at least one side of the film package and oriented in the direction in which the film package is pulled out, the arrangement being such that when pulling out the film package, said arm is angularly displaced to extend the cut end of the film package in the direction opposite to the direction in which the film package is pulled out.

21. A device according to claim 20, further including a movable base movable back and forth for placing the film package in said holder, a rack coupled to said movable rack, an arm swingably disposed on said holder, and a pinion coupled to said arm and held in mesh with said rack, the arrangement being such that after the holder has been stored in a main body of said device, the film package is pulled to displace said movable base to cause said rack and said pinion to swing said arm for folding back a cut end of said film package in the direction opposite to the direction in which the film package is pulled out.

22. The device of claim 1, further comprising engaging means disposed in said holder and including a stopper pressable against the film package, the arrangement being such that when cutting off an end of the film package, said stopper is pressed against the end of the film package to prevent extraneous light from entering the film package through the cut-off end, and said stopper is displaced away from the film package to pull the film package to expose the sheet films in a main body of the device.

23. A device according to claim 22, wherein said holder is removable from said main body, further including a movable base disposed in said holder through a resilient member, said stopper being swingably coupled to said movable base, the arrangement being such that when placing the film package on said movable base, the stopper is pressed against the film package by said resilient member, and when pulling the film package, said movable base is displaced to swing the stopper coupled to the movable base for spacing said stopper from the film package.

24. A device according to claim 22, wherein said holder is removable from said main body, said stopper being disposed in said holder and coupled to a rotative drive source, further including a resilient member engaging said stopper, the arrangement being such that when placing the film package in said holder or magazine, the film package is pressed by the stopper, and when pulling the film package, the stopper is swung by said rotative drive source for spacing the stopper from the film package.

25. The device of claim 1, further comprising an outer casing removably mounted in said main body and having an opening for feeding the sheet films therethrough, an inner casing for storing said film package therein and removable from said outer casing, and a shutter disposed in said outer casing for closing and opening and keeping the film package in a light-shielded condition for allowing said inner and outer casings from being taken together out of said main body.

26. A device according to claim 25, wherein said shutter comprises an angularly movable control member disposed outside of said outer casing, an arm swingable by said control member, and a lever engaging one end of said arm for displacing a main member of said shutter.

27. A device according to claim 26, further including an engaging pin mounted on said main member of the shutter, said lever having a semicircular oblong hole defined in an end thereof, said engaging pin engaging in said semicircular oblong hole, the arrangement being such that when said control member is angularly moved, said main member of the shutter is displaced by said lever to open and close the opening of said outer casing.

28. A device according to claim 25, further including a locking mechanism disposed between said outer and inner casings and actuatable to fix said inner casing to said outer casing when said inner casing is inserted into said outer casing.

29. A device according to claim 28, wherein said locking mechanism a first engaging member disposed inwardly of a side wall of said outer casing and normally urged by a resilient member to move in a prescribed direction, said first engaging member having a first finger, and a second engaging member disposed outwardly of a side wall of said inner casing and having a second finger engageable with said first finger, the arrangement being such that said first and second fingers are engaged and locked together by inserting said inner casing into said outer casing.

30. A device according to claim 29, further including a control member coupled to said first engaging member and externally actuatable for disengaging said first engaging member from said second engaging member.

31. A device according to claim 1, wherein said holder further includes a grip which projects outwardly therefrom.

32. A device according to claim 1, wherein said main body includes an ejector mechanism for securing said holder thereto and for automatically ejecting said holder therefrom.

33. A device according to claim 32, wherein said ejector mechanism includes a spring for biasing said holder.

34. A device according to claim 32, wherein said ejector mechanism includes a stopper means engageable with a recess defined in said holder.

35. A device according to claim 34, wherein said stopper means includes a rotary solenoid with a drive shaft to which an L-shaped hook is attached, said hook being angularly movable in response to energization of said rotary solenoid for bringing a distal end thereof into said recess.

* * * * *